(12) United States Patent
Li et al.

(10) Patent No.: US 8,614,518 B2
(45) Date of Patent: *Dec. 24, 2013

(54) SELF-POWERED VEHICLE SENSOR SYSTEMS

(75) Inventors: Yunjun Li, West Bloomfield, MI (US);
Chandra S. Namuduri, Troy, MI (US);
Timothy J. Talty, Beverly Hills, MI
(US); Robert B. Elliott, Waterford, MI
(US); Nancy McMahon, Rochester
Hills, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 335 days.

This patent is subject to a terminal disclaimer.

(21) Appl. No.: 12/900,707

(22) Filed: Oct. 8, 2010

(65) Prior Publication Data

US 2011/0084503 A1     Apr. 14, 2011

Related U.S. Application Data

(60) Provisional application No. 61/251,395, filed on Oct. 14, 2009.

(51) Int. Cl.
*H02P 9/04* (2006.01)

(52) U.S. Cl.
USPC ............................................... 290/1 R

(58) Field of Classification Search
None
See application file for complete search history.

(56) References Cited

U.S. PATENT DOCUMENTS

| | | | |
|---|---|---|---|
| 2,594,755 A | 4/1952 | Felt |
| 3,770,290 A | 11/1973 | Bottalico |
| 3,984,707 A | 10/1976 | McClintock |
| 4,297,609 A | 10/1981 | Hirao et al. |
| 4,458,234 A | 7/1984 | Brisard |
| 4,600,215 A | 7/1986 | Kuroki et al. |
| 4,757,315 A | 7/1988 | Lichtenberg et al. |
| 4,817,922 A | 4/1989 | Hovance |
| 4,822,063 A | 4/1989 | Yopp et al. |
| 4,827,416 A | 5/1989 | Kawagoe et al. |
| 4,836,578 A | 6/1989 | Soltis |
| 5,009,450 A | 4/1991 | Herberg et al. |
| 5,056,913 A | 10/1991 | Tanaka et al. |
| 5,103,396 A | 4/1992 | Hiwatashi et al. |
| 5,127,667 A | 7/1992 | Okuda et al. |

(Continued)

FOREIGN PATENT DOCUMENTS

| CN | 1559819 A | 1/2005 |
|---|---|---|
| CN | 1603155 A | 4/2005 |

(Continued)

OTHER PUBLICATIONS

U.S. Office Action dated Jul. 6, 2011 for U.S. Appl. No. 12/252,114.

(Continued)

*Primary Examiner* — Vanessa Girardi
(74) *Attorney, Agent, or Firm* — Ingrassia Fisher & Lorenz, P.C.

(57) ABSTRACT

A vehicle system is provided. The vehicle system includes a vehicle suspension apparatus configured for movement during vehicle travel; an energy harvesting device mounted on the vehicle suspension apparatus and configured to generate electrical energy in response to the movement of the vehicle suspension apparatus; and a sensor mounted on the vehicle suspension apparatus and coupled to the energy harvesting device for receiving the electrical energy.

17 Claims, 24 Drawing Sheets

(56) References Cited

U.S. PATENT DOCUMENTS

| | | |
|---|---|---|
| 5,218,308 A | 6/1993 | Posebeck et al. |
| 5,251,729 A | 10/1993 | Nehl et al. |
| 5,267,466 A | 12/1993 | Morris |
| 5,347,186 A | 9/1994 | Konotchick |
| 5,373,445 A | 12/1994 | Yopp |
| 5,390,949 A | 2/1995 | Naganathan et al. |
| 5,450,322 A | 9/1995 | Tanaka et al. |
| 5,461,564 A | 10/1995 | Collins et al. |
| 5,638,927 A | 6/1997 | Cheatham et al. |
| 5,944,763 A | 8/1999 | Iwasaki |
| 5,973,422 A | 10/1999 | Clamme |
| 5,990,441 A | 11/1999 | Zaenglein et al. |
| 6,069,581 A | 5/2000 | Bell et al. |
| 6,111,375 A | 8/2000 | Zenobi |
| 6,209,691 B1 | 4/2001 | Fehring et al. |
| 6,234,654 B1 | 5/2001 | Okuchi et al. |
| 6,328,144 B1 | 12/2001 | Hayakawa et al. |
| 6,427,812 B2 | 8/2002 | Crawley et al. |
| 6,502,837 B1 | 1/2003 | Hamilton et al. |
| 6,614,239 B2 | 9/2003 | Borghi |
| 6,694,856 B1 | 2/2004 | Chen et al. |
| 6,771,007 B2 | 8/2004 | Tanielian |
| 6,866,127 B2 | 3/2005 | Nehl et al. |
| 6,938,311 B2 | 9/2005 | Tanielian |
| 7,057,330 B2 | 6/2006 | Buhler et al. |
| 7,123,351 B1 | 10/2006 | Schaefer |
| 7,221,437 B1 | 5/2007 | Schaefer |
| 7,250,697 B2 | 7/2007 | Beaulieu |
| 7,261,171 B2 | 8/2007 | de la Torre et al. |
| 7,380,800 B2 | 6/2008 | Klees |
| 7,420,462 B2 | 9/2008 | Nordmeyer |
| 7,521,841 B2 | 4/2009 | Clingman et al. |
| 7,654,370 B2 | 2/2010 | Cubalchini, Jr. |
| 7,733,239 B2 | 6/2010 | Nordmeyer |
| 7,737,608 B2 | 6/2010 | Ruggeri et al. |
| 7,770,701 B1 | 8/2010 | Davis |
| 7,777,396 B2 | 8/2010 | Rastegar et al. |
| 7,839,058 B1 | 11/2010 | Churchill et al. |
| 7,849,983 B2 | 12/2010 | St. Clair et al. |
| 7,936,113 B2 * | 5/2011 | Namuduri et al. ............ 310/339 |
| 7,938,410 B2 | 5/2011 | Buma et al. |
| 7,948,613 B2 | 5/2011 | Fourcault et al. |
| 2002/0032508 A1 | 3/2002 | Uchino et al. |
| 2003/0034697 A1 | 2/2003 | Goldner et al. |
| 2005/0077692 A1 | 4/2005 | Ogawa |
| 2005/0090956 A1 | 4/2005 | Ogawa |
| 2005/0270221 A1 | 12/2005 | Fedotov et al. |
| 2006/0176158 A1 | 8/2006 | Fleming |
| 2006/0186586 A1 | 8/2006 | Soles et al. |
| 2006/0188120 A1 | 8/2006 | Fisher |
| 2006/0220330 A1 | 10/2006 | Urquidi et al. |
| 2006/0271678 A1 | 11/2006 | Jessup et al. |
| 2007/0032913 A1 | 2/2007 | Ghoneim et al. |
| 2007/0129865 A1 | 6/2007 | Kim |
| 2007/0205881 A1 | 9/2007 | Breed |
| 2007/0236098 A1 | 10/2007 | Kusase et al. |
| 2007/0247011 A1 | 10/2007 | Shichijoh et al. |
| 2007/0251776 A1 | 11/2007 | Braun |
| 2008/0116849 A1 | 5/2008 | Johnston |
| 2008/0238268 A1 | 10/2008 | Hamada |
| 2008/0252174 A1 | 10/2008 | Mohammadi et al. |
| 2008/0277939 A1 | 11/2008 | Richardson et al. |
| 2008/0284258 A1 | 11/2008 | Spratte et al. |
| 2009/0021720 A1 | 1/2009 | Hecker |
| 2009/0045698 A1 | 2/2009 | Genis et al. |
| 2009/0278927 A1 | 11/2009 | Ishiyama et al. |
| 2010/0045143 A1 | 2/2010 | Martin |
| 2010/0052475 A1 | 3/2010 | Lee |
| 2010/0084947 A1 | 4/2010 | Yoon et al. |
| 2010/0094503 A1 | 4/2010 | Li et al. |
| 2010/0123568 A1 | 5/2010 | Namuduri et al. |
| 2010/0125389 A1 | 5/2010 | Talty et al. |
| 2010/0219641 A1 | 9/2010 | Namuduri et al. |
| 2010/0219720 A1 | 9/2010 | Namuduri et al. |
| 2010/0219721 A1 | 9/2010 | Namuduri et al. |
| 2010/0219798 A1 | 9/2010 | Namuduri et al. |
| 2010/0225527 A1 | 9/2010 | Talty et al. |
| 2010/0244629 A1 | 9/2010 | Nagashima et al. |

FOREIGN PATENT DOCUMENTS

| | | |
|---|---|---|
| CN | 101550982 A | 10/2009 |
| DE | 39 09 190 C1 | 8/1990 |
| DE | 41 12 276 C2 | 11/1992 |
| DE | 295 18 322 U1 | 1/1996 |
| DE | 103 58 764 A1 | 7/2005 |
| DE | 10 2004 010 229 A1 | 9/2005 |
| DE | 10 2005 008 403 A1 | 9/2006 |
| FR | 2594755 A3 | 8/1987 |
| GB | 2 098 007 A | 11/1982 |
| JP | 60101425 A | 6/1985 |
| JP | 4359901 B1 | 11/2009 |

OTHER PUBLICATIONS

U.S. Notice of Allowance dated Jul. 18, 2011 for U.S. Appl. No. 12/394,322.

U.S. Office Action dated Jun. 17, 2011 for U.S. Appl. No. 12/394,326.

U.S. Office Action dated Aug. 1, 2011 for U.S. Appl. No. 12/272,074.

U.S. Final Office Action dated Jul. 15, 2011 for U.S. Appl. No. 12/271,551.

U.S. Office Action for U.S. Appl. No. 12/271,551 mailed Feb. 10, 2011.

German Office Action for German Application No. 10 2009 047 855.8-21 mailed Jan. 21, 2011.

German Office Action for German Application No. 10 2009 052 717.6-21 mailed Feb. 16, 2011.

German Office Action for German Application No. 10 2010 008 318.6 mailed May 11, 2011.

Notice of Allowance, dated Jan. 9, 2012, for U.S. Appl. No. 12/272,074.

Notice of Allowance, dated Jan. 5, 2012, for U.S. Appl. No. 12/271,551.

Chinese Office Action for Chinese Application No. 200910206391.1 mailed Jan. 19, 2011.

Notice of Allowance, dated May 11, 2012, for U.S. Appl. No. 12/394,328.

Notice of Allowance, dated Nov. 16, 2011, for U.S. Appl. No. 12/394,326.

Notice of Allowance, dated Dec. 12, 2011, for U.S. Appl. No. 12/252,114.

Notice of Allowance mailed Nov. 18, 2010, issued in U.S. Appl. No. 12/394,438.

Notice of Allowance mailed Oct. 18, 2010, issued in U.S. Appl. No. 12/400,112.

Sang-Dong, K., et al., "Performance Analysis of UWB Radar for Vehicle in Multi-User Environments," 10th International Conference on Advanced Communication Technology, ICACT. Feb. 17-20, 2008, pp. 1036-1039, vol. 2.

Samkov, S.V., "Signal Processing in UWB Radars of Small Distance," 2004 Second International Workshop on Ultrawideband and Ultrashort Impulse Signals. Sep. 19-22, 2004, pp. 208-210.

Optek Technology, Inc. "Optek's Autopad Contactless Sensor Delivers Absolute Position, Angle and Linear Displacement Sensing." [Retrieved on Aug. 11, 2008]. Retrieved from Internet: <URL: http://license.icopyright.net/user/viewFreeUse.act?fuid=MTM4Mjg4MQ%3D%3D>.

U.S. Office Action for U.S. Appl. No. 12/394,328 mailed Jun. 10, 2011.

Namuduri, Chandra S. et al. "Notice of Allowance" mailed Jan. 4, 2011; U.S. Appl. No. 12/394,438 filed Feb. 27, 2009.

Chinese Office Action, dated Aug. 8, 2012, for Chinese Patent Application No. 201010582613.2.

Chinese Patent Office, Office Action in Chinese Patent Application No. 201010582613.2, dated Mar. 26, 2013.

State Intellectual Property Office of the P.R.C., Office Action in Chinese Patent Application No. 201010582613.2, dated Sep. 9, 2013.

* cited by examiner

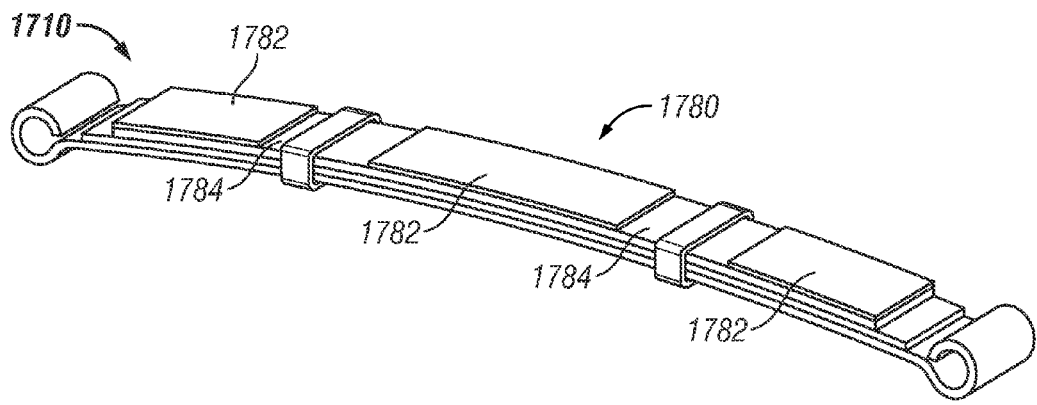
FIG. 17
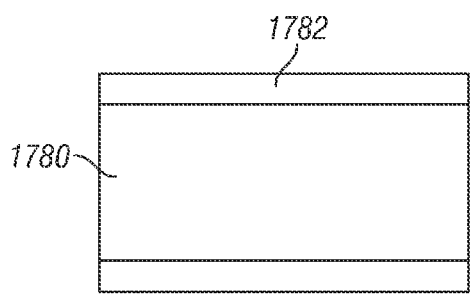
FIG. 18
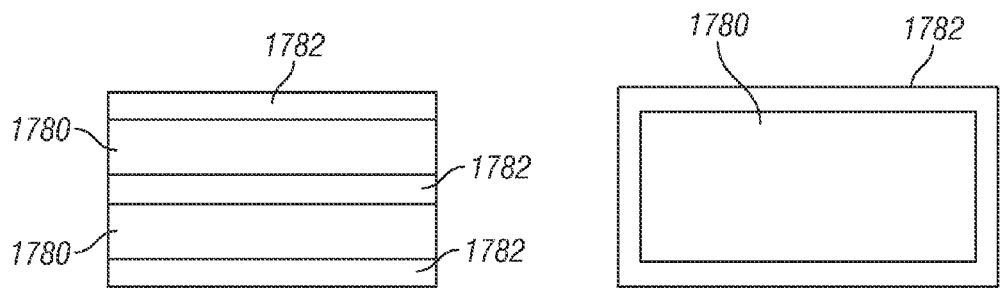
FIG. 19     FIG. 20

SELF-POWERED VEHICLE SENSOR SYSTEMS

CROSS-REFERENCE TO RELATED APPLICATION

This application claims the benefit of U.S. Provisional Application No. 61/251,395, filed Oct. 14, 2009, the disclosure of which is hereby incorporated by reference.

TECHNICAL FIELD

This relates generally to sensor systems in motor vehicles and, more particularly, to sensor systems in motor vehicles that may be self powered by harvesting energy from vehicular vibrations.

BACKGROUND OF THE INVENTION

Increasing demands for better fuel economy have lead to improvements and developments in hybrid vehicles, electric vehicles, and vehicles powered by fuel cells or diesel fuel. Efforts on the part of the automotive industry to increase fuel economy have included reductions in mass, improved aerodynamics, active fuel management, and hybrid engines. Still, other mechanisms, techniques, and energy sources that will improve fuel economy are continually being sought.

It is generally known that vehicles are subjected to vibrations, especially while being driven. Conventionally, these vibrations have been considered undesirable. In fact, a great deal of effort has gone into the development of suspension systems that include springs, damper assemblies, and the like, that provide vehicular stability and insulate the passenger compartment from vibration caused by, for example, driving on bumpy or otherwise tortuous roadways. Currently, the energy associated with these vibrations is lost. However, harvesting and utilizing this energy would provide an additional source of energy that could be used to increase fuel economy, for example, by producing an additional source of useable energy for the vehicle. The ability to tap this additional source of energy while not compromising the benefits of modern vehicular suspension systems would benefit both the automotive industry and their customers.

Accordingly, it is desirable to provide a systems for harvesting the energy associated with vehicle vibrations to produce useable power as well as systems that are configured to make use of this power. Furthermore, other desirable benefits, features, and characteristics will become apparent from the subsequent summary, detailed description, and the appended claims, taken in conjunction with the accompanying drawings and this background.

DESCRIPTION OF THE DRAWINGS

The embodiments will hereinafter be described in conjunction with the following drawing figures, wherein like numerals denote like elements.

FIG. 17 is an isometric view of an energy harvesting device suitable for use with the self-powered sensor system of FIG. 2 in accordance with a further exemplary embodiment;

FIGS. 18, 19, and 20 are cross-sectional views of a leaf spring of FIG. 17;

SUMMARY OF THE INVENTION

Figure 1:
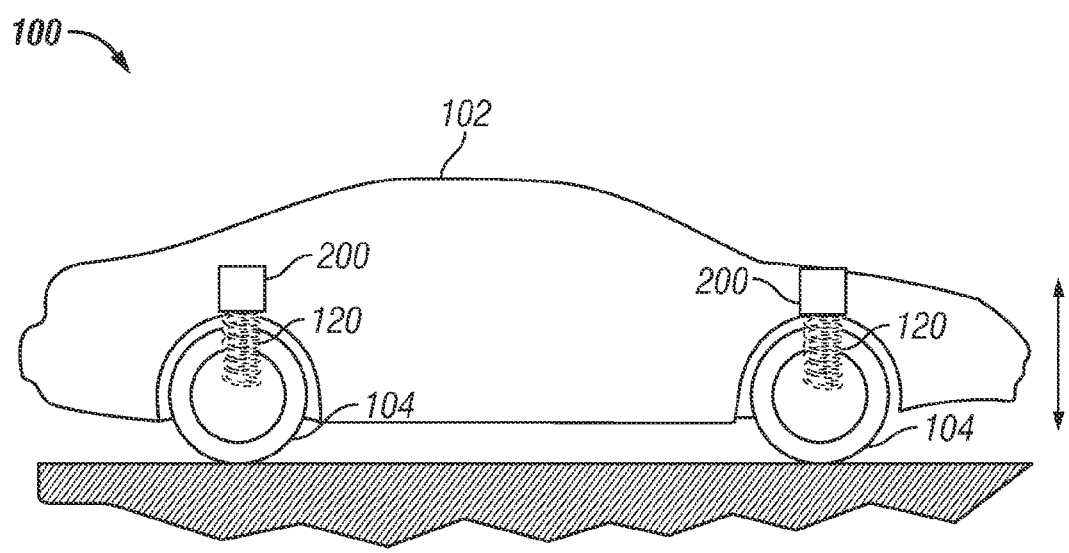
FIG. 1 is a diagram of a vehicle that incorporates a self-powered sensor system in accordance with an exemplary embodiment.

In accordance with an exemplary embodiment, a vehicle system is provided. The vehicle system includes a vehicle suspension apparatus configured for movement during vehicle travel; an energy harvesting device mounted on the vehicle suspension apparatus and configured to generate electrical energy in response to the movement of the vehicle suspension apparatus; and a sensor mounted on the vehicle suspension apparatus and coupled to the energy harvesting device for receiving the electrical energy.

In accordance with another exemplary embodiment, a vehicle system includes a vehicle suspension apparatus configured for movement during vehicle travel; and a sensor comprising a piezoelectric device mounted on the vehicle suspension apparatus and configured to generate electrical energy indicative of the movement of the vehicle travel.

In accordance with another exemplary embodiment, vehicle system is provided. The system includes a damper assembly with a dust tube assembly and a damper tube assembly mounted for telescopic movement within the dust tube during vehicle travel. The system further includes a sensor mounted within the dust tube and configured to detect a position of the dust tube and an energy harvesting device mounted on the damper assembly and configured to provide electrical energy to the sensor.

DESCRIPTION OF AN EXEMPLARY EMBODIMENT

The following detailed description is merely illustrative in nature and is not intended to limit the invention or the application and uses of the invention. Furthermore, there is no intention to be bound by any expressed or implied theory presented in the preceding technical field, background, brief summary or the following detailed description. The invention may be described herein in terms of functional and/or logical block components and various processing steps. It should be appreciated that such block components may be realized by any number of hardware, software, and/or firmware components configured to perform the specified functions. For the purposes of conciseness, conventional techniques and systems related to semiconductor processing, transistor theory, packaging, and power modules are not described in detail herein.

The following description refers to elements or nodes or features being "connected" or "coupled" together. As used herein, unless expressly stated otherwise, "connected" means that one element/node/feature is directly joined to (or directly communicates with) another element, node or other feature in mechanical, logical, electrical or other appropriate sense. Likewise, unless expressly stated otherwise, "coupled" means that one element/node/feature is directly or indirectly joined to (or directly or indirectly communicates with) another element/node/feature in a mechanical, logical, electrical or other appropriate sense. The term "exemplary" is used in the sense of "example," rather than "model." Further, although the figures may depict example arrangements of elements, additional intervening elements, devices, features, or components may be present in a practical embodiment of the invention.

FIG. 1 is a schematic representation of a vehicle 100 that includes a self-powered sensor system 200. In one exemplary embodiment, the sensor system 200 is mounted on a component of a suspension system 120 that couples a first (upper) component 102 and a second (lower) component 104. As described below, the suspension system 120 may includes various damper assemblies (or shock absorbers), coil springs, and leaf springs that enable relative movement between the components 102 and 104 of the vehicle 100. As also described below, this movement may be harvested as useable energy for the sensor system 200.

The first component 102 may be considered a sprung component and generally includes the passenger cabin, engine, and most body panels. The second component 104 may be considered an unsprung component and includes components, features, or elements of a vehicle that are coupled to the ground or some other reference location in a substantially rigid manner, including the tires, brake rotors, axles, and undamped suspension links.

As such, during vehicle motion, the suspension assembly 120 couples the first and second components 102, 104 together to provide a flexible and damped response to substantially vertical motion so as to limit and stabilize such motions thus providing a more comfortable ride to the passengers. As described below, it is desirable to detect various parameters related to the suspension system 120 and the vehicle 100 in real-time (or substantially real-time) for purposes of improved ride and handling, vehicle height control, stability control, traction control, and the like.

Figure 2:
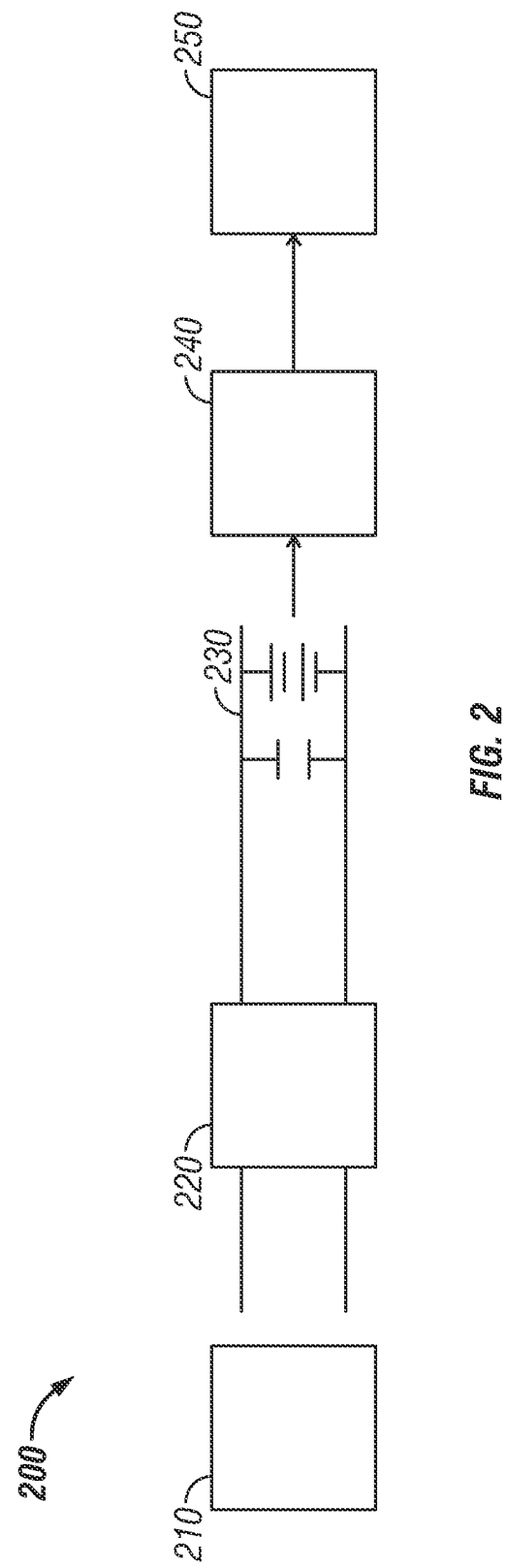
FIG. 2 is a block diagram of the sensor system of FIG. 1 in accordance with an exemplary embodiment.

FIG. 2 is a block diagram of an exemplary sensor system 200 in accordance with an exemplary embodiment that may be incorporated into the vehicle 100 of FIG. 1. The sensor system 200 includes an energy harvesting device 210, an energy converter 220, an energy storage device 230, a sensor 240, and a transmitter 250. Generally, the energy harvesting device 210 is a device that generates variable amplitude, variable frequency AC energy as a result of motion within the suspension system 120 (FIG. 1) during vehicle travel. The energy harvesting device 210 may include, for example, piezoelectric materials or mini-turbines, and is discussed in greater detail below.

The AC energy generated by the energy harvesting device 210 is applied to the energy converter 220, which in turn converts the AC energy to DC energy. The energy converter 220 may be, for example, a rectifier, amplifier, and/or a regulator. In one exemplary embodiment, energy harvesting device 210 may produce an AC sinusoidal waveform, which is received by the energy converter 220 that may include a full wave synchronous rectifier. The rectified signal may be applied to a low pass filter in the energy converter 220 to produce a DC voltage. The DC voltage generated by the energy converter 220 may be within the range of about 100 mV to about 300 mV, within the range or 1V to 18V, or any desired voltage. In practice, this voltage range may vary as needed to accommodate the needs of the sensor and signal transmitter in the intended application.

The output of energy converter 220 may be used to charge the energy storage device 230, which may, for example, a capacitor and/or a battery. The energy storage device 230 may power one or more sensors 240 that, in turn, provide information to one or more of the vehicle's on-board processors via the transmitter 250, which may also be powered by the energy storage device 230. As noted above and discussed in greater detail below, the sensor 240 may be an infrared, ultrasonic, laser or other type of sensor that measures a vehicle parameter such as relative and absolute height and wheel acceleration. The transmitter 250 may be, for example, a wireless transceiver that communicates with a vehicle controller via UWB, infrared, ultrasonic, laser, and the like. In one embodiment, the sensor 240 and transmitter 250 are an integrated unit and include a processor for carrying out the tasks described below.

FIGS. 3-25 generally illustrate a number of energy harvesting devices that may be used as the energy harvesting device 210 of FIG. 2. Additionally, the energy harvesting devices discussed below may be incorporated into damper assemblies or springs that may be a component of the suspension system 120 of FIG. 1.

Figure 3:
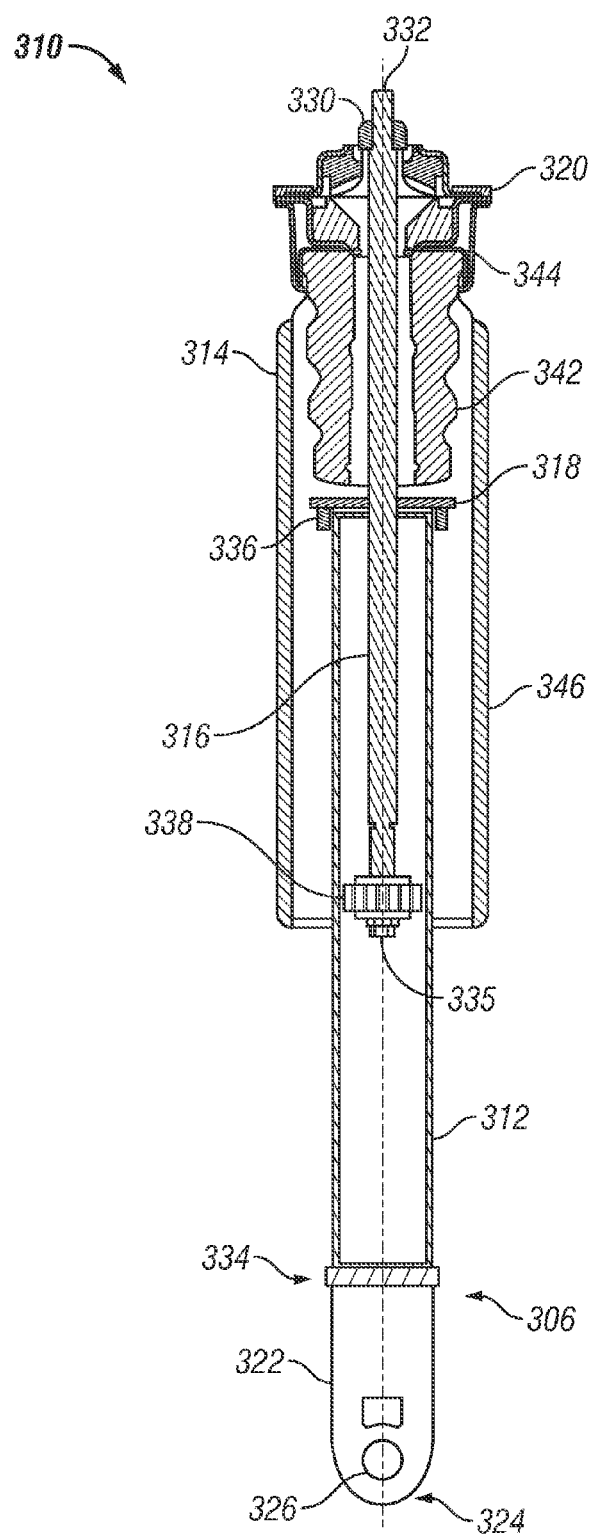
FIG. 3 is a cross-sectional view of an energy harvesting device suitable for use with a self-powered sensor system of FIG. 2 in accordance with a further exemplary embodiment.

For example, FIG. 3 is an energy harvesting device 310 that may be incorporated into a damper assembly (or shock absorber) 306. The damper assembly 306 includes a damper tube 312, an exterior cylindrical housing or dust tube 314, a piston rod 316, a piston 338 having a plurality of channels therethrough described below, nut 335, a rod guider/seal 318, an upper mount assembly 320, and a lower mounting bracket 322. Damper assembly 306 may be coupled to a lower control arm, which may correspond to the lower component 104 (FIG. 1), at a first end 324 utilizing an opening 326 in bracket 322 that is configured to receive a suitable fastener. Damper assembly 306 is likewise connected at a second end to frame member, which may correspond to the upper component 102 (FIG. 1) with a self-locking flange nut 330 that is screwed onto a threaded end 332 of piston rod 316. Damper tube 312 is connected to mounting bracket 322 at a lower end 334, and is connected to rod guide/seal 318 at an upper end 336. Piston rod 316 is positioned within damper tube 312 and extends through rod guide/seal 318. An optional jounce bumper 342 may be formed by, for example, hard rubber. The jounce bumper 342 is coupled to a jounce bumper bracket 344 and is disposed concentrically about piston rod 316. Dust tube 346 is coupled to upper mount assembly 320 and extends concentrically around damper tube 312. Thus, damper tube 312 and dust tube 346 are configured for telescopic movement with respect to each other. That is, damper tube 346 is free to move or vibrate into and out of dust tube 346 as the vehicle encounters perturbations such as bumps and the like in the roadway.

If the surface of the roadway is rough, damper tube 312 will undergo vibrational type movement into and out of dust tube 346, each time requiring fluid to flow past piston 338. That is, if damper tube 312 is being forced into dust tube 346 (e.g., as the vehicle suspension traverses to jounce), fluid must flow from the region in front of piston 338 to the region behind piston 338. If damper tube 312 is being pulled out of dust tube 346 (e.g., as the vehicle suspension traverses to rebound), fluid flows from the region behind piston 338 to the region in front of piston 338. In FIG. 3, damper tube 312 is oriented vertically, and movement of damper tube 312 will be referred to as up or down with respect to piston 338.

Figure 4:
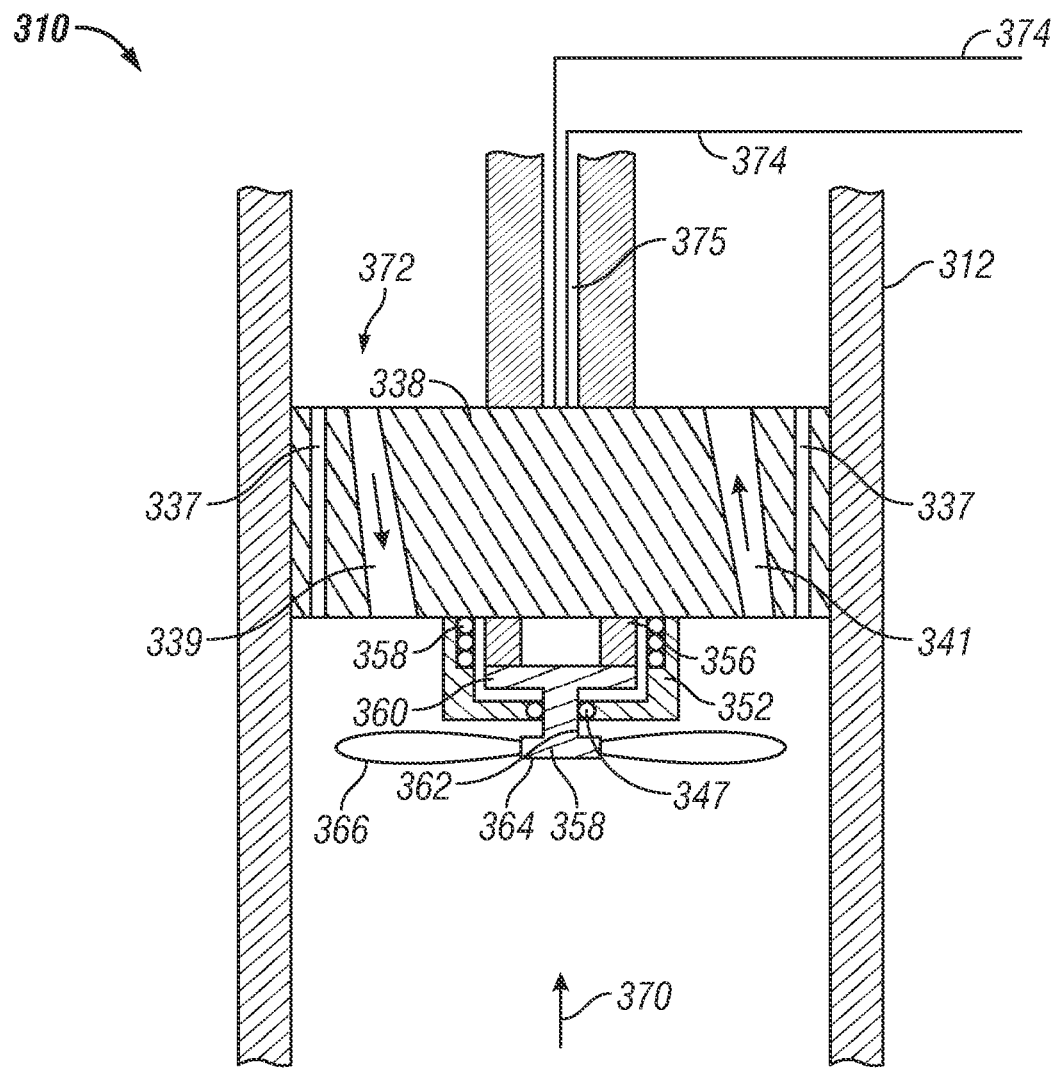
FIG. 4 is a more detailed view of the energy harvesting device of FIG. 3.

FIG. 4 is a partial more detailed cross-sectional view of the energy harvesting device 310 of FIG. 3. The energy harvesting device 310 is coupled to the substantially cylindrical piston 338 and includes a substantially cylindrical cup shaped housing 352, an engine such as a micro-turbine assembly 354 mounted for rotation in housing 352, a substantially cylindrical permanent magnet 356 coupled to or mounted on micro-turbine assembly 354 and configured for rotation therewith, and a stationary coil 358 positioned in housing 352 adjacent permanent magnet 356. Magnet 356 may be a single or multiple pole-pair magnet.

As illustrated, micro-turbine assembly 354 includes a substantially cylindrical support plate 360 that resides substantially inside housing 352, a spindle 362 that extends through a low friction bearing 347 or the like in a lower portion of housing 352 and terminates with a hub portion 364, and at least two blades 366 each configured to respond to fluid engagement therewith causing turbine assembly 354, and therefore, permanent magnet 356, to rotate. Rotation of blades 366 takes place in a first direction when the fluid is being forced upward or in the direction indicated by arrow 370, and in a second opposite direction when fluid is being forced downward or in the direction indicated by arrow 372. Blades 366 may extend to within close proximity of the inner wall damper tube 312.

Typically, piston 338 is provided with a plurality of channels therethrough; e.g., low speed bleed holes 337, a compression port 341, and a rebound port 339. Piston 338 is sealed at the sidewall of damper tube 312 forcing all fluid to flow through the bleed holes 337 and/or rebound port 339 and/or compression port 341, and valves associated therewith (not shown) to provide the required damping force.

The rotation of the permanent magnet 356 with respect to the coil 358 converts the mechanical energy provided by the translation of piston 338 into electrical energy. This process, commonly referred to as electromechanical energy conversion, is based upon Faraday's law of electromagnetic induction that provides that if a coil, also referred to as a winding, is linked to a varying magnetic field (i.e., the coil 358 is linked to the permanent magnet 356), an electromagnetic force (EMF), or voltage, is induced across the coil. Therefore, the permanent magnet 356, which is an electromagnet, provides the magnetic field, that can be adjusted and set with the field intensity of the magnet. EMF induction occurs at coil 358, and the associated AC current is carried from the coil 358 by means of electrical conductors 374 in piston rod channel 375 and applied to inputs to an energy converter, such as the converter 220 (FIG. 2). The portion of housing 352 near coil 358 may be a soft magnetic material while support plate 360, spindle 362, hub 364, and blades 366 may be non-magnetic so as to focus the magnetic flux toward coil 358. As such, the energy harvesting device 310 produces a voltage that may be used to power other components of the sensor system as described below.

Figure 5:
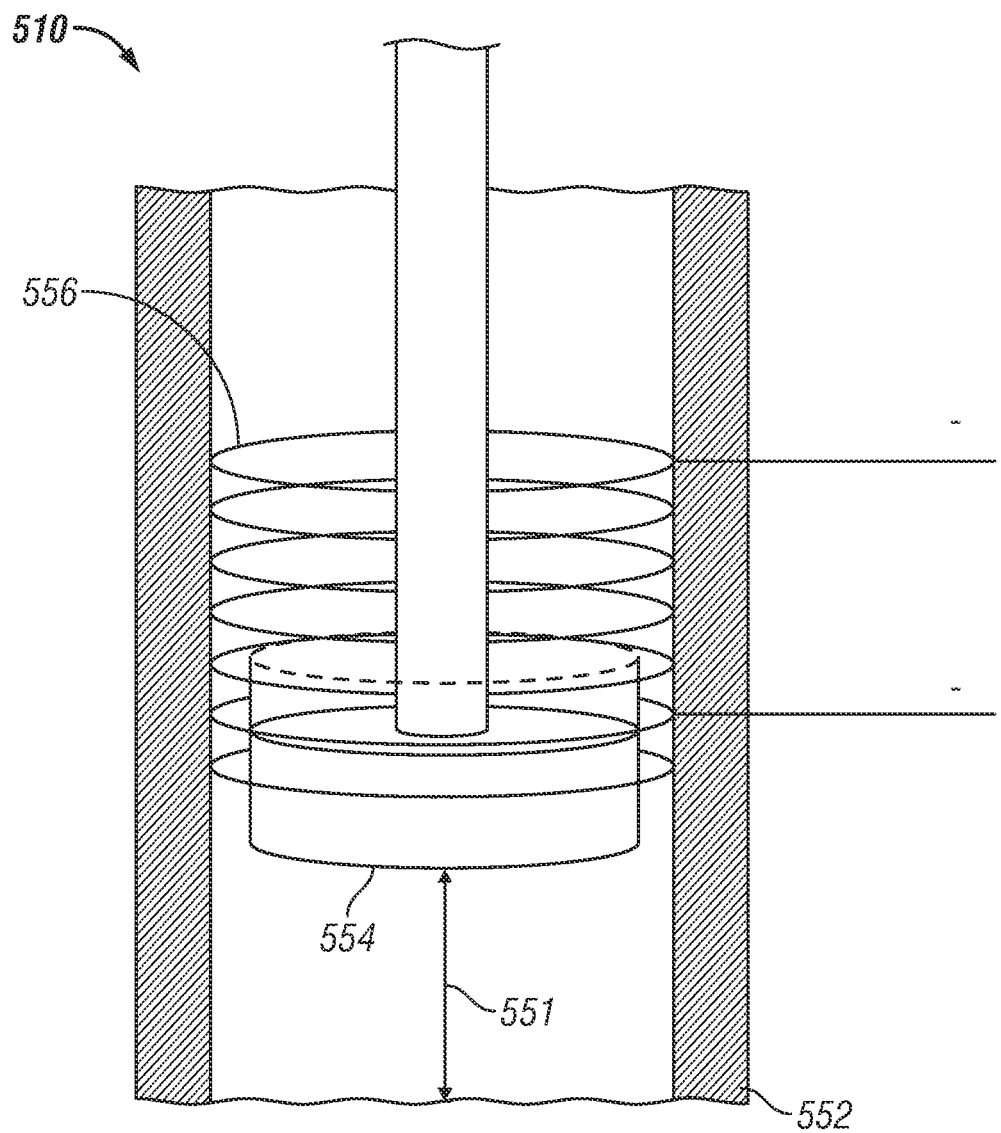
FIG. 5 is a partial cross-sectional view of an energy harvesting device suitable for use with a self-powered sensor system of FIG. 2 in accordance with an exemplary embodiment.

FIG. 5 is a partial cross-sectional view of another energy harvesting device 510, which may include a permanent magnet 554 mounted in a damper assembly of the type shown in FIG. 4 and is configured for oscillating translational movement with respect to a coil 556 likewise mounted in or on damper assembly 552. The oscillating translational motion is indicated by arrow 551. The oscillating movement of the permanent magnet 554 with respect to the coil 556 converts the mechanical energy provided by the translation of magnet 554 into electrical energy, as described above.

Figure 6:
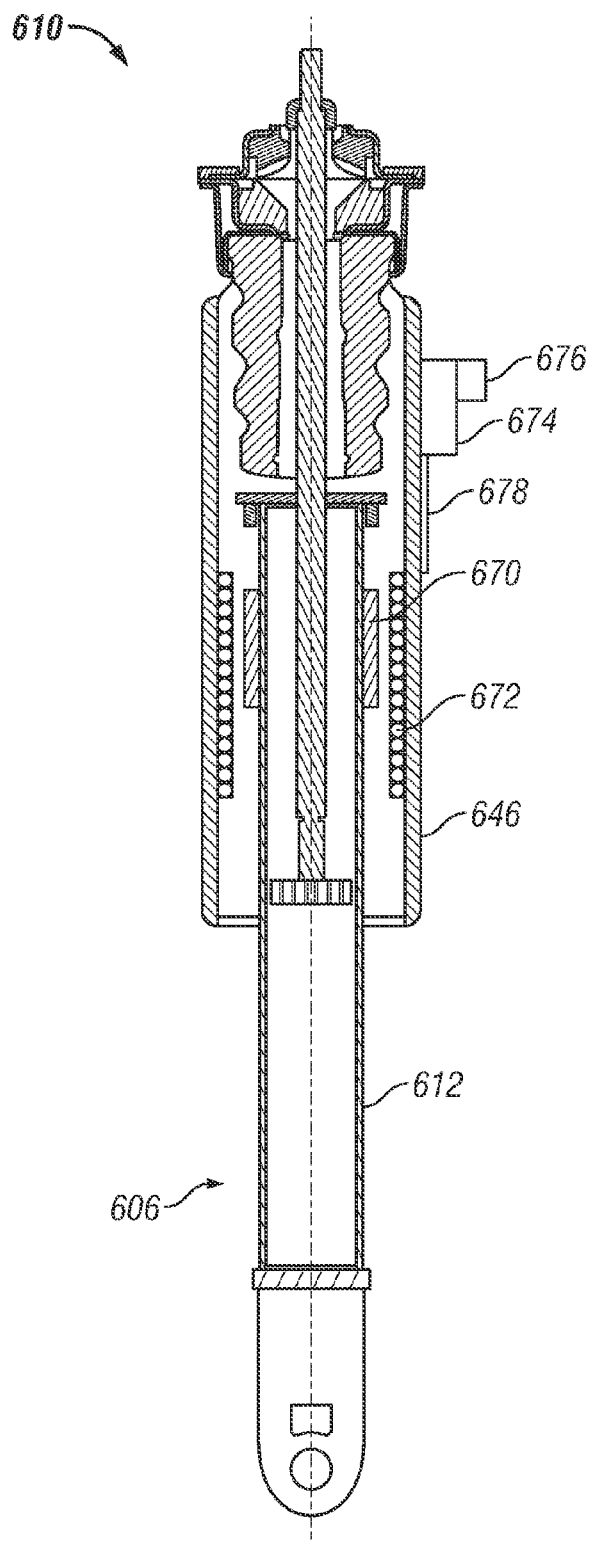
FIG. 6 is a cross-sectional view of an energy harvesting device suitable for use with a self-powered sensor system of FIG. 2 in accordance with a further exemplary embodiment.

FIG. 6 is a cross-sectional view of another energy harvesting device 610 in accordance with a further embodiment. The energy harvesting device 610 is mounted in a damper assembly 606 similar in construction and operation to that shown in FIG. 4 with the exception of the addition of a magnet 670 fixedly couple to a surface of damper tube 612, a coil 672 fixedly coupled to a surface of dust tube 646 and, optionally, a rectifier 674 and connector 676 coupled to coil 672 via a conductor 678. A rechargeable battery may also be provided. The rectifier 674 may correspond to the energy converter 220 (FIG. 2) described above. As damper tube 612 oscillates within dust tube 646 as a result of the vehicle suspension engaging in jounce and rebound, magnet 670 vibrates back and forth within or in close proximity to coil 672 thus inducing an AC current in coil 672 as previously described.

Figure 7:
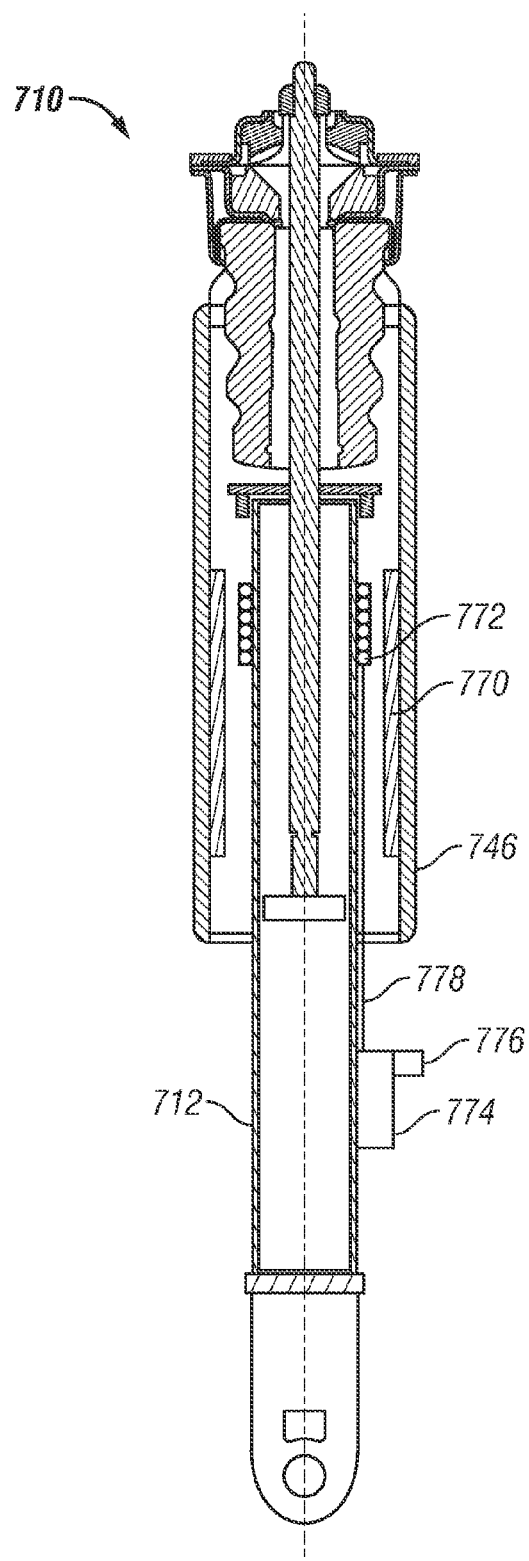
FIG. 7 is a cross-sectional view of an energy harvesting device suitable for use with a self-powered sensor system of FIG. 2 in accordance with a further exemplary embodiment.

FIG. 7 is a cross-sectional view of an energy harvesting device 710 incorporated into a damper assembly 706 in accordance with a further embodiment. Relative to the view of FIG. 6, the relative positions of magnet 770 and coil 772 have been exchanged. That is, magnet 770 is now fixedly coupled to an inner surface of dust tube 746, and coil 772 is mounted on an outer surface of damper tube 712. To accommodate this reversal, rectifier 774 and connector 776 may now be coupled to the surface of damper tube 712 via conductor 778 as shown. A rechargeable battery may also be provided. The operation of the system shown in FIG. 7 is similar to that previously described in connection with FIG. 6. In this case, however, coil 772 oscillates in the vicinity of magnet 770 to induce a current in coil 772.

Figure 8:
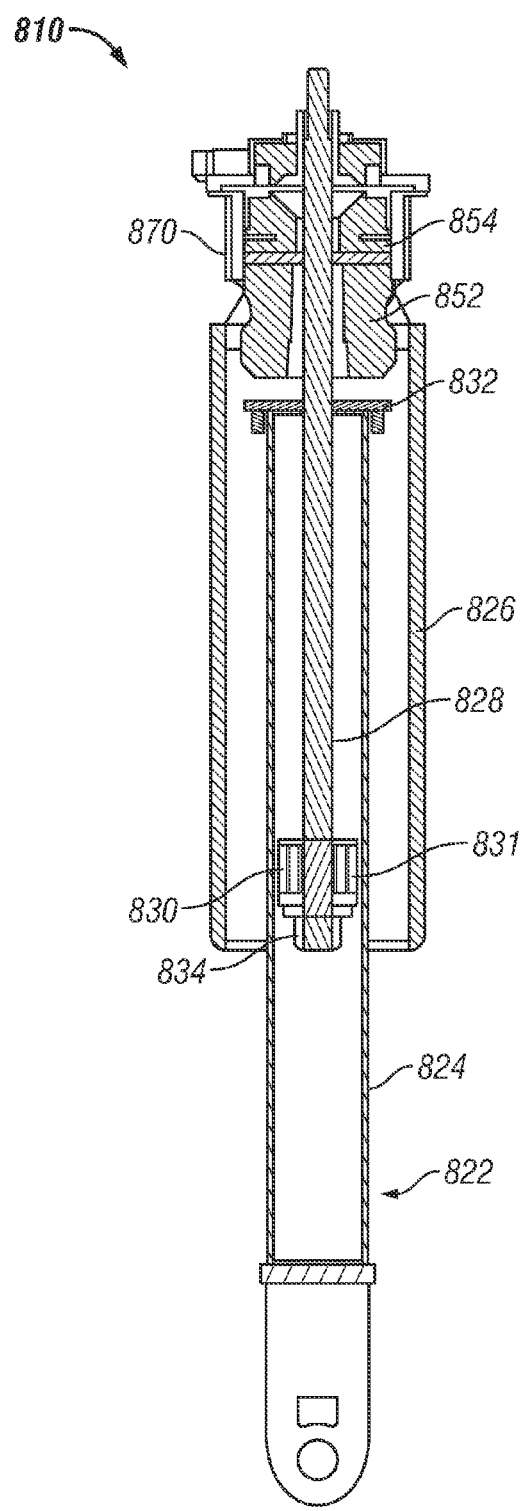
FIG. 8 is a cross-sectional view of an energy harvesting device suitable for use with the self-powered sensor system of FIG. 2 in accordance with a further exemplary embodiment.

FIG. 8 is a cross-sectional view of an energy harvesting device 810 in accordance with a further embodiment incorporated into a damper assembly 822 similar to those described above. As such, the damper assembly 822 includes a damper tube assembly 824, an exterior cylindrical housing or dust tube assembly 826, a piston rod 828, a piston 830 secured on piston rod 828, a jounce bumper stopper 832, and an elastomeric jounce bumper assembly 852.

In this embodiment, the jounce bumper assembly 852 functions as a portion of the energy harvesting device 810 with piston 830, as described below. The jounce bumper assembly 852 is formed by, for example, an elastomeric material such as polyurethane, is coupled to a jounce bumper bracket 854 and is disposed concentrically about piston rod 828. Dust tube 826 is coupled to upper mount assembly 836 and extends concentrically around damper tube 824. Thus, damper tube 824 and dust tube 826 are configured for telescopic movement with respect to each other. That is, damper tube 824 is free to move or vibrate into and out of dust tube 826 as the vehicle encounters perturbations such as bumps and the like in the roadway.

Typically, piston 830 is provided with a plurality of channels 831 therethrough; e.g. low speed bleed holes, a compression port, and a rebound port. Piston 830 is sealed at the inner sidewalls of damper tube assembly 824 forcing all fluid to flow throughout the bleed holes and/or rebound port and compression port, and valves associated therewith (not shown), to provide the required damping force. If the surface of a travelled roadway is rough (i.e. contains bumps, potholes, and the like), damper tube assembly 824 will repeatedly be forced into dust tube 826, causing jounce bumper stopper 832 to impact and compress jounce bumper assembly 852.

Figure 9:
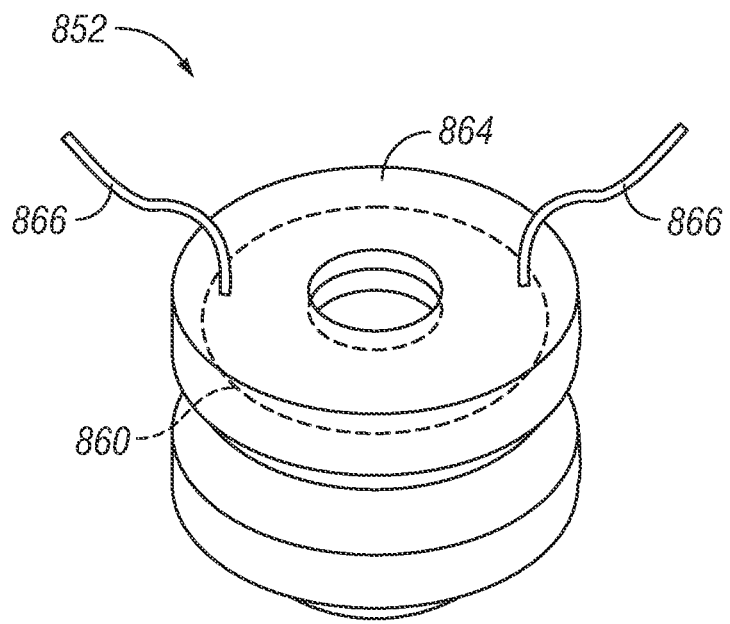
FIG. 9 is an isometric view of a jounce bumper assembly of the energy harvesting device of FIG. 8 in accordance with an exemplary embodiment.

FIG. 9 is an isometric view of the annular jounce bumper assembly 852 in accordance with a first embodiment. The jounce bumper assembly 852 includes a piezoelectric device in the form of, for example, a piezoelectric fiber composite disk 860 that is imbedded in the elastomeric jounce bumper material 862 near surface 864. Piezoelectricity is a characteristic of certain materials to generate an electric potential when they are subjected to a mechanical stress. Known piezoelectric materials include, but are not limited to, naturally occurring crystals, man-made crystals, and certain ceramics. More recently, piezoelectric fiber composite transducers have been developed that have certain advantages over bulk piezoelectric ceramics. For example, they are lighter, more flexible, and more robust. Higher piezoelectric voltage coefficients can be obtained from piezoelectric fiber composites resulting in more generated power. Furthermore, piezoelectric fiber composites can be created inexpensively to user defined shapes. They provide increased strength as a result of fiber lead sharing, and may be laminated with durable polyethylene sheets for additional toughness. Piezoelectric fiber composites may be used singly, or multiply in parallel, to accumulate power for an extended period of time. Such devices are commercially available from Advanced Cerametrics, Inc., located in Lambertville, N.J.

When utilized in the damper assembly shown in FIG. 8, surface 864 and therefore piezoelectric disk 860 will be positioned proximate jounce bumper bracket 854. When configured in the above described manner, piezoelectric disk 860 will be strained each time jounce bumper stopper 832 engages and compresses jounce bumper assembly 852 causing a voltage to be generated across terminals 866. This AC energy may be applied to rectifier, as described above, for conversion to DC energy.

Figure 10:
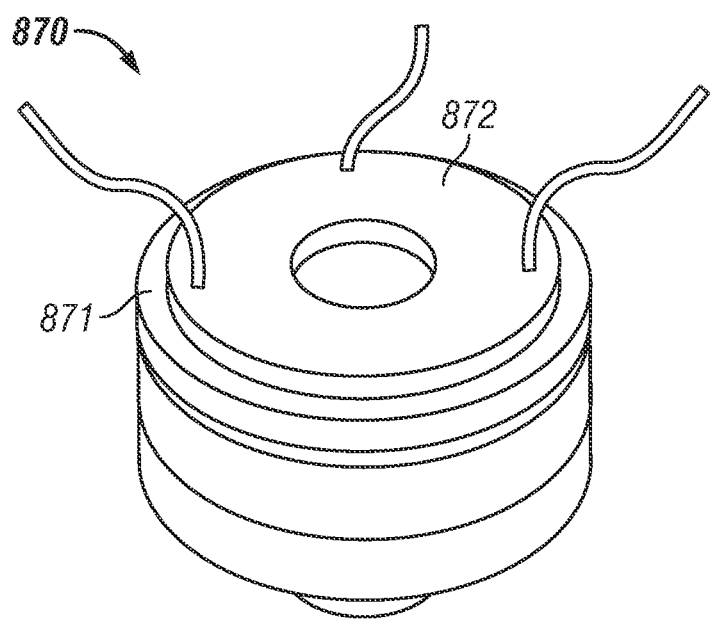
FIG. 10 is an isometric view of a jounce bumper assembly of the energy harvesting device of FIG. 8 in accordance with another exemplary embodiment

FIG. 10 is an isometric view of a jounce bumper assembly 870 in accordance with another embodiment and may replace the jounce bumper assembly 822 in FIG. 8. It differs from jounce bumper assembly 822 only with respect to the placement of a piezoelectric disk 872. In this embodiment, a piezoelectric disk 872 is attached to an outer surface 871 of jounce material 874 such that when jounce bumper 870 is deployed in the damper assembly shown in FIG. 8, piezoelectric disk 872 will be exposed to and reside adjacent jounce bumper bracket 832.

Figure 11:
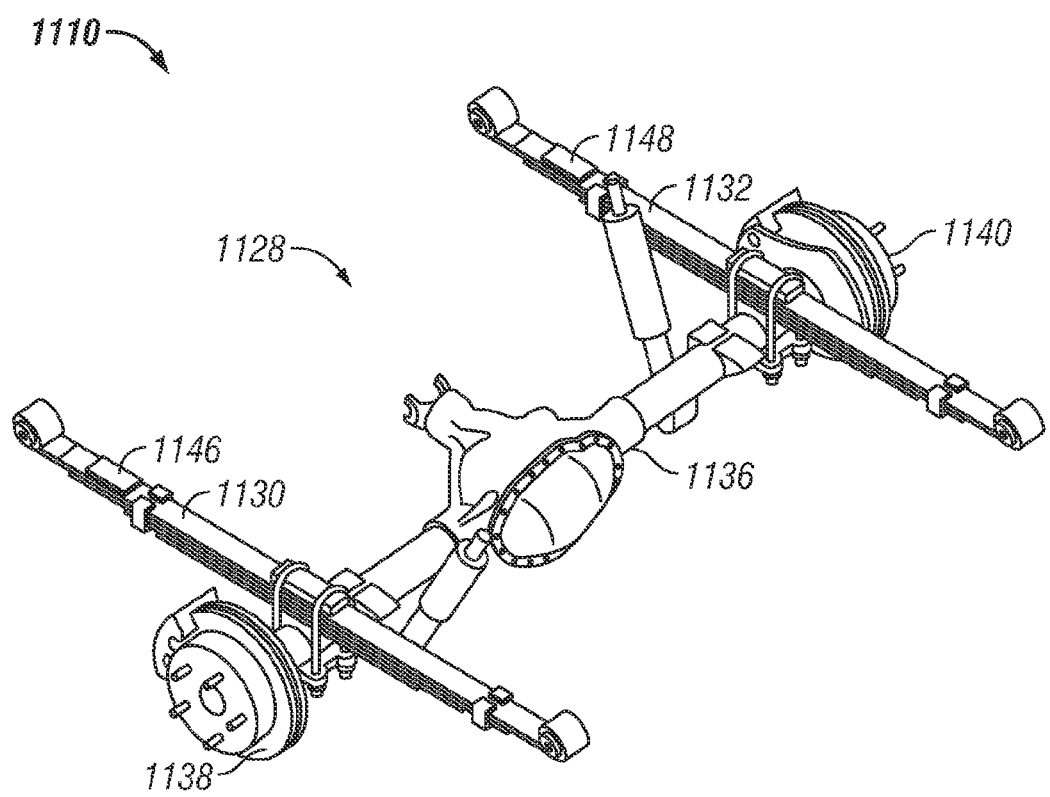
FIG. 11 is an isometric view of energy harvesting device suitable for use with the self-powered sensor system of FIG. 2 in accordance with a further exemplary embodiment.

FIG. 11 is an isometric view of an energy harvesting device 1110 coupled to a vehicular spring suspension 1128. The leaf spring assemblies 1130 and 1132 are coupled to an axle/differential housing 1136. Individual wheels (not shown) are coupled to rotors 1138 and 1140 respectively.

The leaf spring assemblies 1130 and 1132 may include, for example, a slender, arc-shaped length of steel spring having a generally rectangular cross-section. For heavier vehicles, several leaves may be stacked on each other forming several layers typically with progressively shorter leaves. The leaf spring assemblies 1130 and 1132 may be attached directly to the frame at both ends, or at one end directly and through a shackle, or short swing arm, at the other end.

Figure 12:
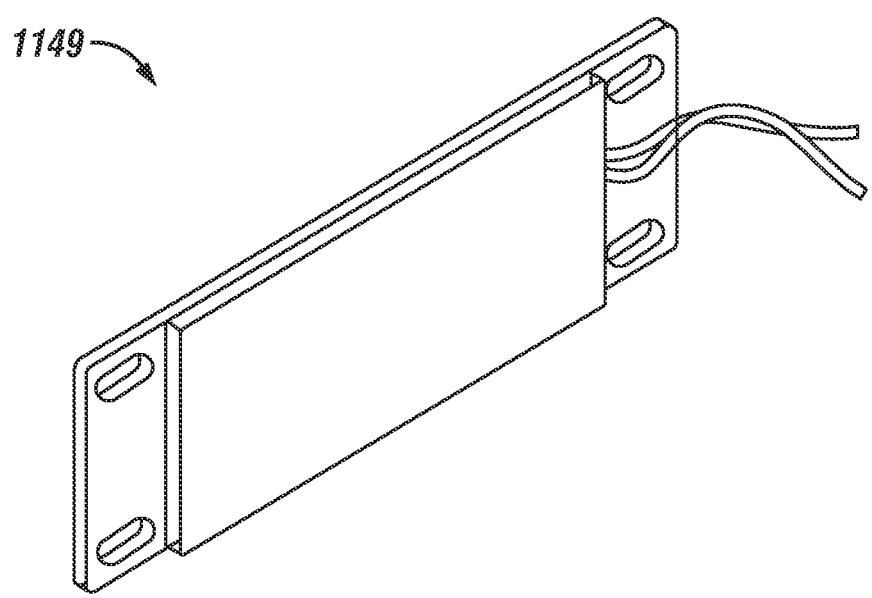
FIG. 12 is an isometric view of a piezoelectric fiber composite device of the energy harvesting device of FIG. 11.

First and second flexible piezoelectric devices 1146 and 1148 are attached to the top of the first leaf of leaf spring assemblies 1130 and 1132, respectively. The piezoelectric devices 1146, 1148 may be, for example, piezoelectric fiber composites. One such device 1149 is shown in FIG. 12 for clarity. Referring to both FIGS. 11 and 12, as the leaf springs on which piezoelectric devices 1146 and 1148 are attached compress or expand during vehicle suspension travel, the piezoelectric devices 1146 and 1148 will deform and generate a voltage. The generated voltage is proportional to the degree of strain or stress that the leaf spring undergoes. Thus, as the amount of the deformation increases and/or the frequency of the deformation increases, then the amount of electric power generated by piezoelectric devices 346 and 348 increases, which is converted to DC energy as described above.

Figure 13:
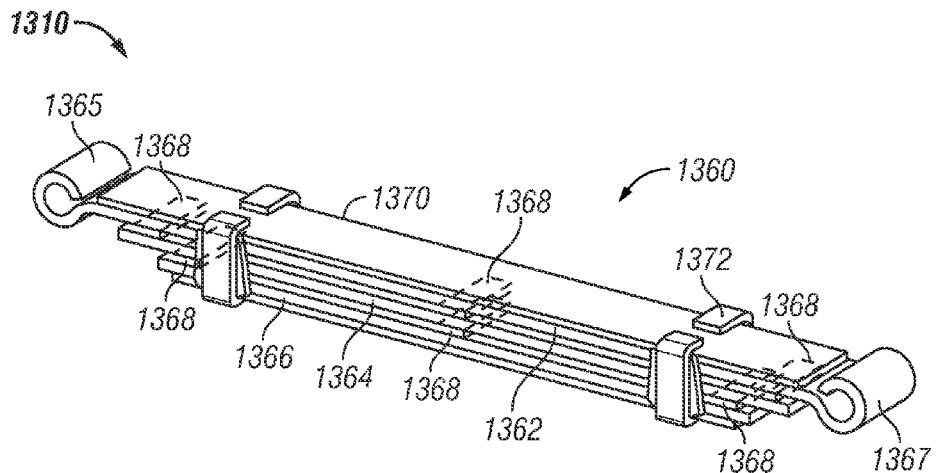
FIG. 13 is an isometric view of an energy harvesting device suitable for use with the self-powered sensor system of FIG. 2 in accordance with a further exemplary embodiment.
Figure 14:
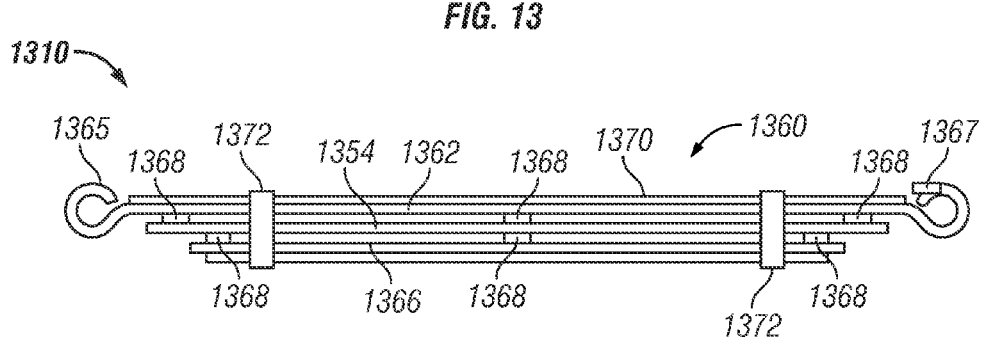
FIG. 14 is a side view of the energy harvesting device of FIG. 13.

FIGS. 13 and 14 are isometric and sides views, respectively, of an energy harvesting device 1310 incorporated into a leaf spring assembly 1360 similar to the leaf spring assemblies 1130 and 1132 of FIG. 11 in accordance with a further embodiment. The leaf spring assembly 1360 includes, for example, three leaves 1362, 1364, and 1366. Top leaf 1362 is provided with couplers 1365 and 1367 that facilitate the coupling of leaf spring assembly 1360 to a vehicle frame. To reduce inter-leaf friction, isolation pads 1368 are provided between leaves.

Figure 15:
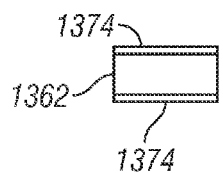
FIGS. 15 and 16 are cross-sectional views of a leaf spring of FIGS. 13 and 14.
Figure 16:
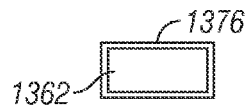

A layer of piezoelectric material 1370, which may be a piezoelectric fiber composite, is coupled to the upper surface of leaf spring 1362. The piezoelectric material 1370 may be bonded to the upper surface of leaf 1362 using a suitable chemical bonding material. Alternatively, piezoelectric material 1370 may be clipped onto the upper surface of leaf 1362 with mechanical clips 1372. If desired, piezoelectric material 1370 may be attached to both upper and lower surfaces of one or more leaves of leaf spring assembly 1360 as is shown in FIG. 15 or attached on four surfaces of each leaf as shown in FIG. 16. The piezoelectric material 1370 deposited in accordance with the above may be coupled to an energy converter 220 (FIG. 2). Further, the multiple piezoelectric elements could be fastened to the surfaces and electrically connected in either a parallel or series arrangements where the parallel connection enables continued operation in the event of an electrical open in any one of the devices and the series connection enables continued operation in the event of an electrical short in any one of the devices.

FIG. 17 is an isometric view of an energy harvesting device 1710 embodied as a leaf spring assembly 1780, and FIGS. 18-20 are cross-sectional views of various embodiments of the energy harvesting device 1710. In this case, piezoelectric devices such as piezoelectric fiber composites 1782 may be attached to the surface 1784 at various locations on leaf spring 1780. As was the case previously, piezoelectric fiber composites 1782 may be coupled to an energy converter 210, as described above in FIG. 2 to form part of a sensor system. The piezoelectric fiber composite material may be attached to the major surfaces of the leaf spring 1780 (FIG. 18), on the four surfaces of leaf spring 1780 (FIG. 20), or the piezoelectric material 1782 may be incorporated into a laminated composite spring (FIG. 19).

Figure 21:
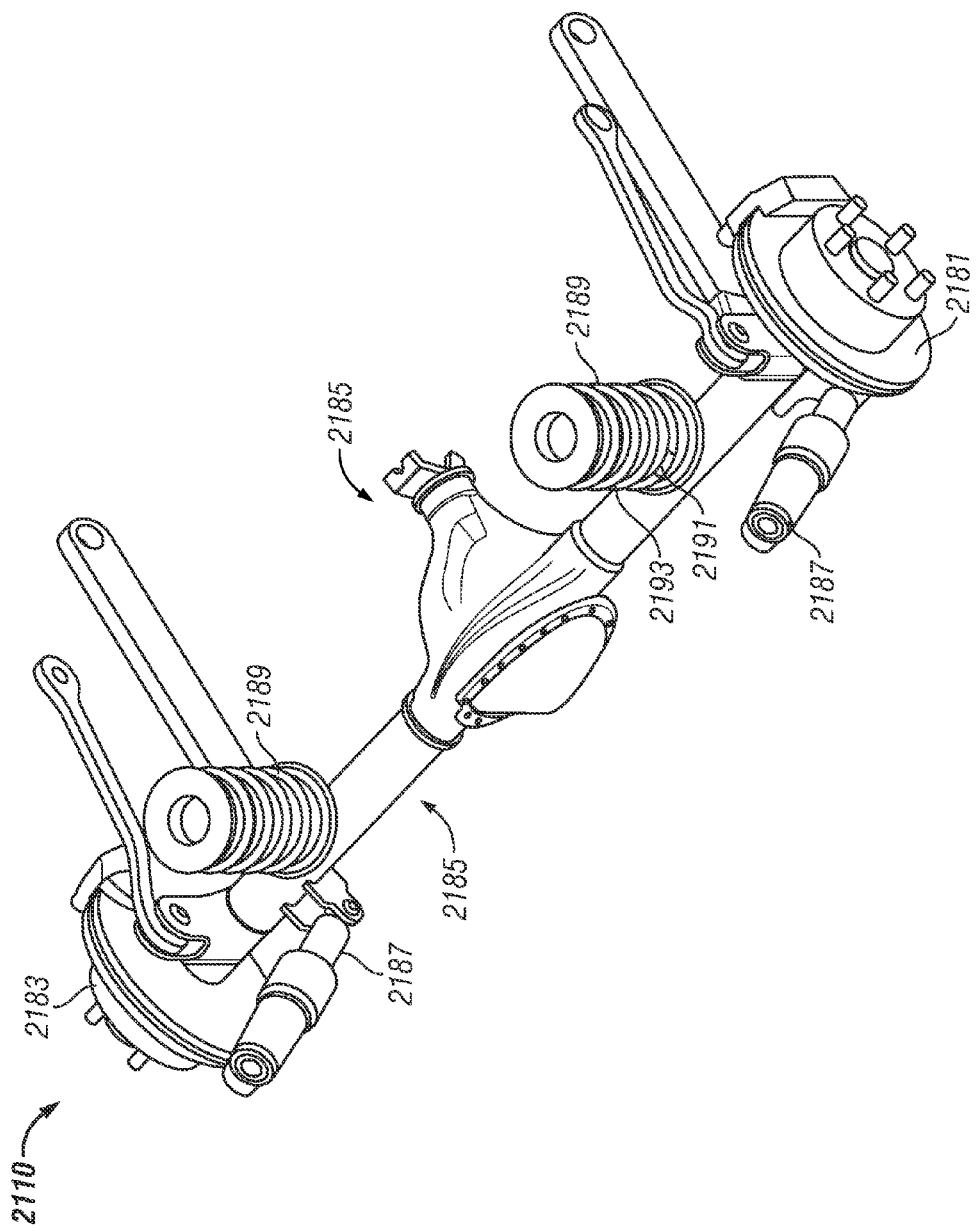
FIG. 21 is an isometric view of an energy harvesting device suitable for use with the self-powered sensor system of FIG. 2 in accordance with a further exemplary embodiment.
Figure 22:
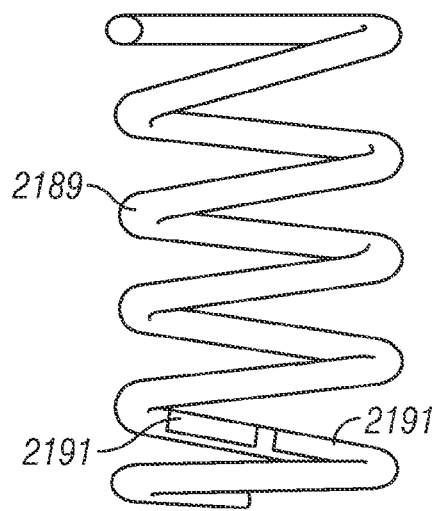
FIG. 22 is an side view of a coil spring suitable for use in the energy harvesting device of FIG. 21.

FIG. 21 is an isometric view of an energy harvesting device 2110 in accordance with another embodiment and illustrates the energy harvesting device 2110 incorporated into an automotive coil spring suspension system, which may correspond to the suspension system 120 (FIG. 1). First and second hubs 2181 and 2183 are mounted for rotation on axle assembly 2185. Damper assemblies 2187 and coil springs 2189 are coupled between axle assembly 2185 and the vehicle frame (not shown). In this embodiment, flexible piezoelectric composite strips 2191 of the type described above are mounted on coil spring 2189, as is shown more clearly in FIG. 22. As the coil springs extend and compress during vehicle travel, piezoelectric strips 2191 (or a plurality of patches in series or parallel) will deform resulting in a voltage across terminals. In this embodiment, a rectifier 2193 (e.g., that corresponds to energy converter 210 of FIG. 2) may be mounted to the vehicle structure (e.g. the axle assembly) and coupled to piezoelectric strips 2191 to convert the AC signal from the piezoelectric strip 2191 to DC energy. In the case of a composite coil spring, the piezoelectric material could be placed between laminated layers.

Figure 23:
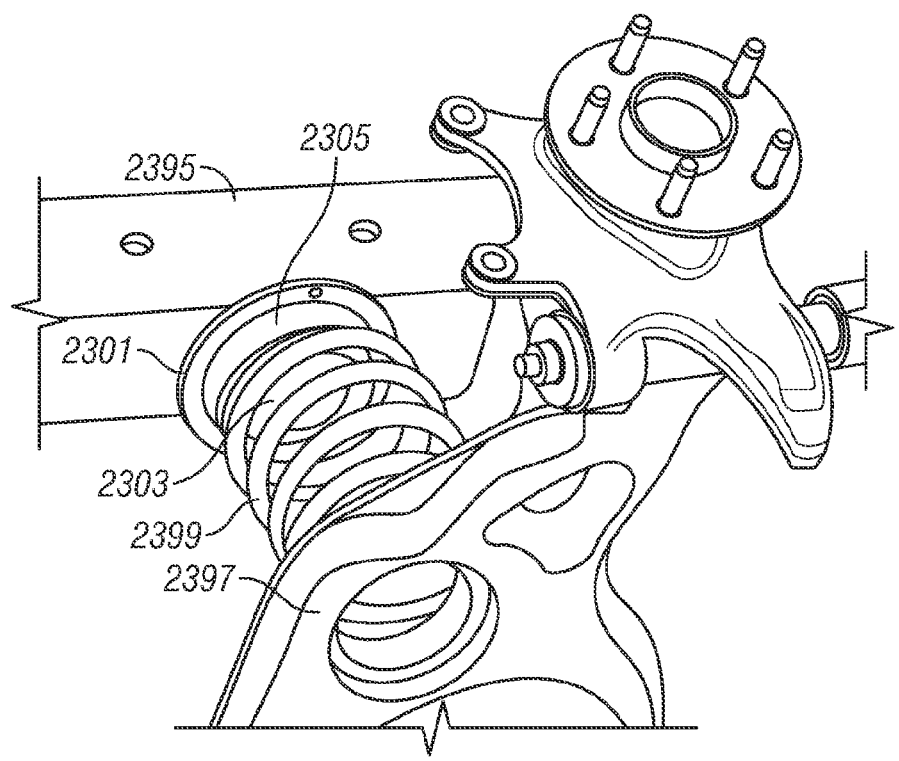
FIG. 23 is an isometric view of an energy harvesting device suitable for use with the self-powered sensor system of FIG. 2 in accordance with a further exemplary embodiment.

FIG. 23 is an isometric view of an energy harvesting device 2310 in accordance with a further embodiment incorporated into an automotive suspension, which may correspond to suspension system 120 (FIG. 1) and includes a frame or body side rail 2395, a lower control arm 2397, and a coil suspension spring 2399 coupled between frame 2395 and control arm 2397. The spring 2399 is coupled to frame 2395 with a spring seat 2301 having a central protrusion 2303 that positions the upper portion of spring 2399, and a spring isolator 2305 made of a resilient material (e.g. rubber, polyurethane elastomer, etc.) positioned between coil spring 2399 and spring seat 2301 to avoid contact noise during suspension travel.

Figure 24:
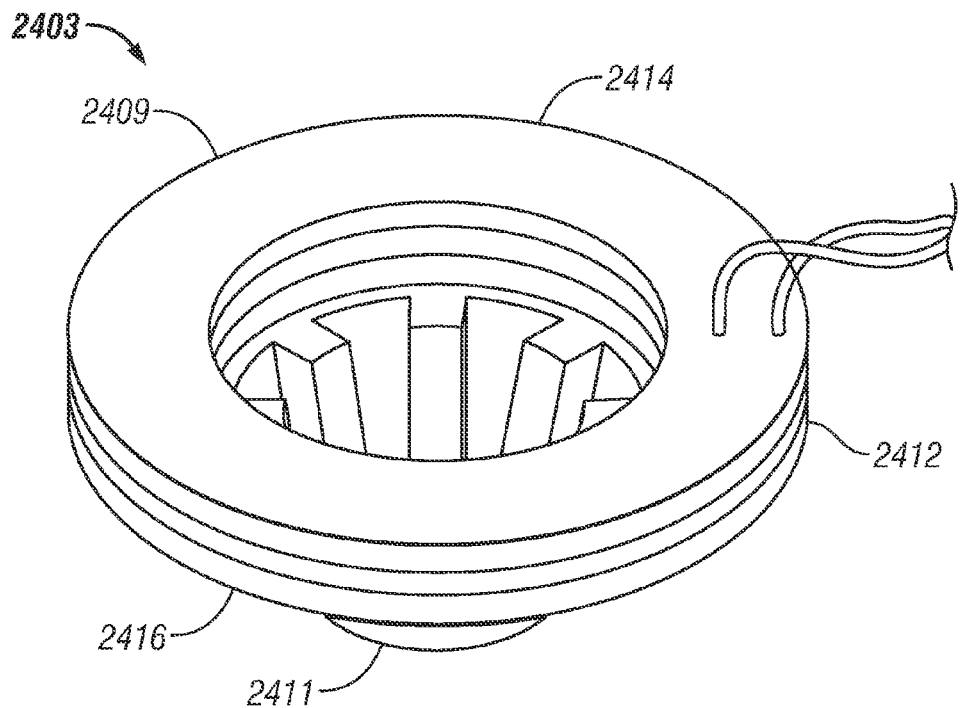
FIGS. 24 and 25 are isometric views of first and second spring isolators for use in the energy harvesting device of FIG. 23.
Figure 25:
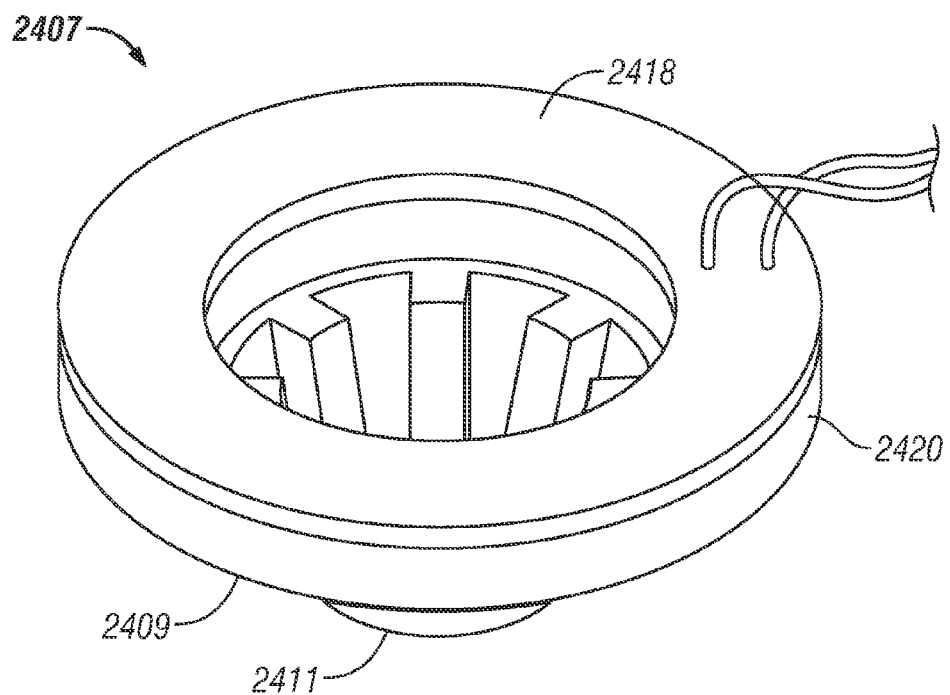

FIGS. 24 and 25 are first and second embodiments of spring isolators 2403 and 2407, respectively, that may be incorporated into the energy harvesting device 2310 of FIG. 23. In each case, the spring isolators 2403 and 2407 include an annular portion 2409 and a central protrusion 2411. Each is provided with a piezoelectric annular disk 2412. In FIG. 24, piezoelectric disk 2412 is positioned between layers of resilient material 2414 and 2416. In FIG. 25, a layer of piezoelectric material 2418 resides on an upper surface of resilient material 2420. The piezoelectric material may, alternatively, be molded inside the isolator so as to be protected from the environment.

Thus, when either spring isolator 2403 or 2407 is positioned between coil spring 2399 and spring seat 2301, compressions and expansions in coil spring 2399, resulting from roadway perturbations encountered during vehicle travel, will result in deformations of piezoelectric disks 2403 or 2407, thereby resulting in the generation of AC energy at the output terminals.

FIGS. 26-36 depict various sensor systems that may be powered by the energy harvesting devices described above. Although some of the embodiments below are described in conjunction with particular energy harvesting devices, any of the energy harvesting devices described above may be incorporated into any of the sensor systems described below.

Figure 26:
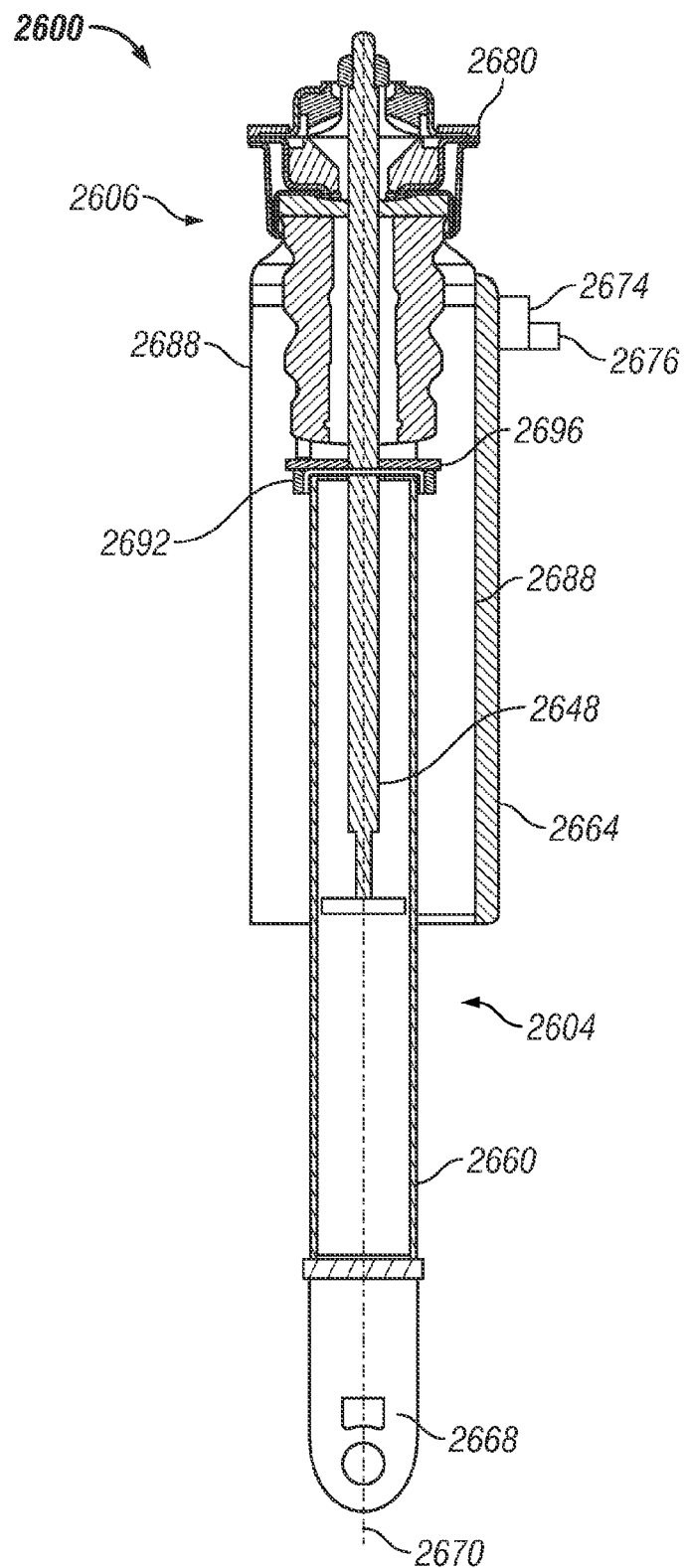
FIG. 26 is a cross-sectional view of a sensor system in accordance with a further exemplary embodiment.

FIG. 26 is a cross-sectional view of a sensor system 2600 incorporated into a damper assembly 2604 in accordance with an exemplary embodiment that is similar in construction to the damper assemblies discussed above. Schematically, the components described below correspond to the sensor system 200 of FIG. 2, and the dampening components may correspond to the suspension system 120 of FIG. 1.

Damper assembly 2604 includes a cylindrical body or damper tube 2660, a cylindrical exterior housing or dust tube 2688, a piston rod 2648, an end member 2696, an upper mount assembly 2680, and a lower mounting bracket 2668. Damper assembly 2604 further includes a sensor board 2664 and a target 2692. Sensor board 2664 may assume the form of any device suitable for sensing the relative position of target 2692 and generating an output signal indicative of that position. In the exemplary embodiment illustrated in FIG. 26, sensor board 2664 assumes the form of a pad-type flexible circuit board that is fixedly mounted to, and preferably conforms with, the inner annular surface of dust tube 2688. Although not shown in FIG. 26 for clarity, sensor board 2664 is populated with various electronic components, including, for example, an application specific integrated circuit (ASIC) that may be adapted to drive the other components (e.g., magnetic coils) of sensor board 2664. A target 2692 having a suitable magnetic pattern disposed on another flexible circuit board, and is magnetically coupled to sensor board 2664. Target 2692 may comprise a puck-shaped body mounted to damper tube 2660 proximate to upper end 2606. However, it will be appreciated that target 2692 may assume other geometries and dispositions within damper assembly 2604 in alternative embodiments. The length of sensor board 2664 (as measured along a central axis 2670) is sufficient to provide continuous coupling to target 2692, and thus depends on the range of vertical travel of damper tube 2660. The width or angular coverage of sensor board 2664 is also sufficient to maintain coupling to target 2692 and compensate for any torsional displacements between damper tube 2660 and dust tube 2688. A connector 2676 is mounted either within a sealed opening in dust tube 2688, or at the end of a wiring harness threaded through such an opening, and provides an electrical coupling between sensor board 2664 and external electronics assemblies. These assemblies, that in one embodiment include a processor 2674, are configured to receive signals from sensor board 2664 and determine the position of target 2692 relative to sensor board 2664.

In another embodiment, processor 2674 may be disposed within dust tube 2688 and may be included as a component of sensor board 2664. Processor 2674 may be further expanded to include a local controller coupled to, and configured to provide control for, an electronically controlled damper assembly. In this case, connector 2676 may provide power for sensor board 2664 and provides a communication channel whereby relative height data generated by processor 2674 may be transferred, for example, to a vehicle suspension controller.

During operation, changes in vertical distance between the sprung/unsprung vehicle masses (e.g., first and second components 102 and 104 of FIG. 1) are transferred to damper tube 2660 coupled to the unsprung vehicle mass, and to dust tube 2688 coupled to the sprung vehicle mass. As damper tube 2660 moves vertically with respect to dust tube 2688, target 2692 moves with respect to sensor board 2664 in a non-contacting manner. In one embodiment, sensor board 164 includes a series of miniature coils for generating and receiving magnetic fields that target 2692 interacts with. This interaction changes the phase of these fields in a manner dependant upon the relative position of target 2692 with sensor board 2664. Sensor board 2664 generates phase change signals based upon this interaction that are transferred through connector 2676 to a supporting external electronics assembly that may include, for example, processor 2674. The electronics assembly then uses these phase change signals to locate the position, and thus relative height of target 2692 to sensor board 2664. Such sensors are commercially available under the product designation Autopad™ through TT Electronics OPTEK Technology located in Carrollton Tex. Relative height data may be further used by a suspension controller (not shown) coupled to the electronics assembly and configured to adjust controlled suspension elements accordingly. Those of skill in the art will appreciate that other types of inductive sensing systems may be used to determine relative displacements between internal components of a damper assembly and thereby, the relative height of sprung and unsprung vehicle masses. These include but are not limited to systems based upon Hall Effect magnetic coupling provided that coupling of sensor/target components is divided between sprung and unsprung vehicle masses.

Figure 27:
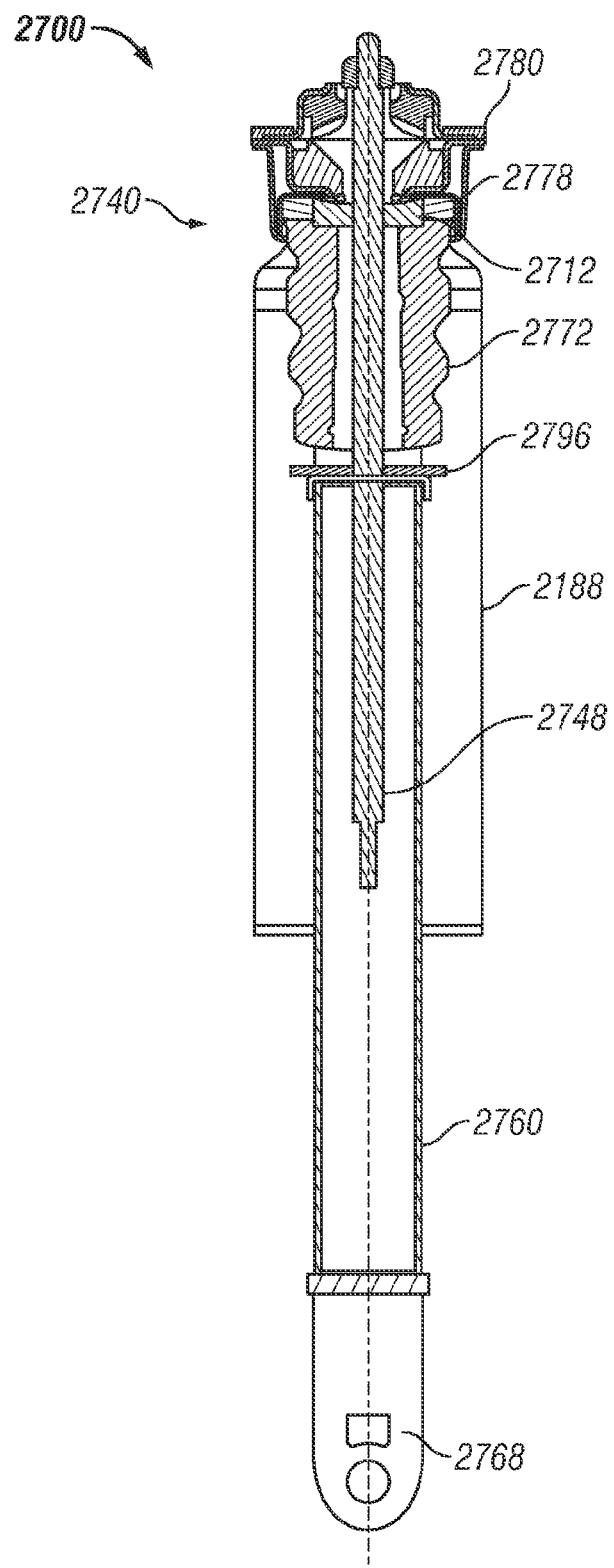
FIG. 27 is cross-sectional view of a sensor system in accordance with a further exemplary embodiment.

FIG. 27 is a cross-sectional view of a sensor system 2740 incorporated into a damper assembly 2740 having a height sensing system in accordance with a further embodiment. Damper assembly 2740 is configured with many of the same internal elements as damper assembly 2604 (of FIG. 26) including a cylindrical body or damper tube 2760, a housing or a dust tube 2788, a piston rod 2748, an optional jounce bumper bracket 2778, an optional jounce bumper 2772, an end member 2796 (that takes the form of a jounce bumper stopper when jounce bumper 2772 is present), an upper mount assembly 2780, and a lower mounting bracket 2768. When damper tube 2760 is highly compressed, end member 2796 butts against jounce bumper 2772 coupled to jounce bumper bracket 2778 providing a cushioned limit of travel. A sensor element 2712 is mounted to jounce bumper bracket 2778 and is configured with an annular or semi-annular shape that surrounds or partially surrounds piston rod 2748. A portion of jounce bumper 2772 may be removed to accommodate sensor element 2712 and prevent it from damage when jounce bumper 2772 is compressed.

In one embodiment, end member 2796 may comprise a ferromagnetic metal such as iron or carbon steel that acts as a target inductively or electromagnetically coupled to sensor element 2712. Sensor element 2712 comprises a permanent magnet for generating a magnetic field, and has sensing coils configured to detect changes in the magnetic field. A suitable permanent magnet comprises a material composition that remains permanently magnetized, and continuously generates a magnetic field such as, for example, neodymium iron cobalt (NdFeCo), or aluminum nickel cobalt (AlNiCo). During operation, the motion of end member 2796 relative to sensor 2712 alters the magnetic field in a manner indicative of the relative distance between them. In another embodiment, end member 2796 may comprise a permanent magnetic material for generating a magnetic field, and sensor 2712 is configured to sense changes in the field as end member 2796 moves relative to sensor 2712. In either case, sensor 2712 generates a signal indicative of the sensor-to-target distance. A suitable connector 2720 couples sensor element 2712 through an opening in dust tube 788, providing a means for transmitting this signal to an external electronics assembly that may include a processor and/or a chassis controller (not shown).

Figure 28:
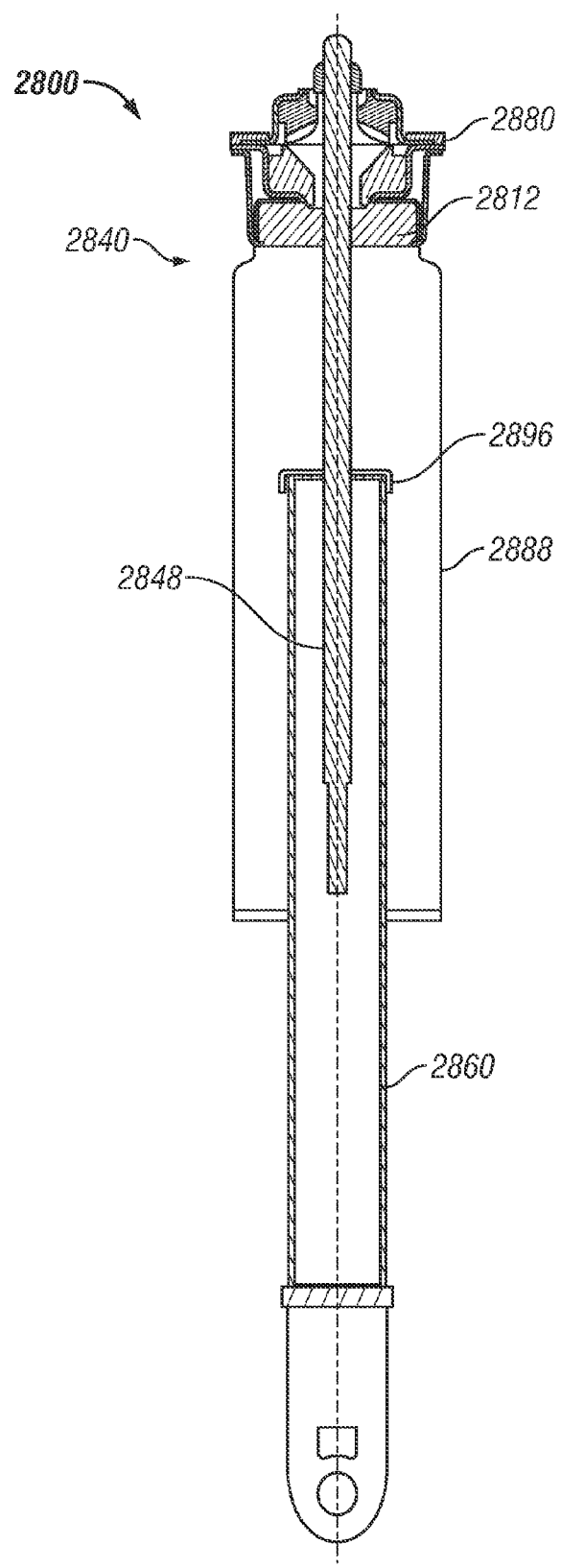
FIG. 28 is cross-sectional view of a sensor system in accordance with a further exemplary embodiment.

In another embodiment illustrated in FIG. 28, a sensor system 2840 is incorporated into a damper assembly 2840 that does not include a jounce bumper, and sensor element 2812 is fixedly mounted to an inside surface of dust tube 2888. In this case, end member 2896 may take the form of a suitable end cap that in one embodiment has an annular shape, and is coupled to upper end and slidably coupled to piston rod 2848. End member 2896 and sensor 2812 are each suitably configured for magnetic coupling with each other as previously described, and therefore may be used in conjunction with a damper tube 2860 comprising a ferromagnetic or a non-feromagnetic material. For example, if damper tube 2860 is fabricated from a non-magnetic stainless steel, end member 2896 is configured to provide inductive coupling to sensor element 2812. In either of these embodiments, and whether or not a jounce bumper is used, both end member 2896 and sensor element 2812 are encased within dust tube 2888 and/or upper mount assembly 2880, each providing protection from road debris and contamination. Further, the components may be conveniently accessed for service without replacing of the entire damper assembly.

During operation, the vertical distance between sprung and unsprung vehicle masses varies depending on road conditions and the speed of the vehicle, causing damper tube 2860 to move concentrically along piston rod 2848 into and out of dust tube 2888. Accordingly, the height differential between end member 296 acting as the target, and sensor element 2812 also changes. Sensor element 2812 is configured to sense changes in a magnetic field generated by motion of target end member 2896 relative to sensor 2812, and generate an output signal indicative of the relative position between these elements. The output signal is processed by an electronics assembly that may be disposed within dust tube 2888 and that may include processor, to determine the relative height differential. These data may further be transferred to chassis controller (not shown) that responds to relative height variations by adjusting suspension elements accordingly. In another embodiment, sensor element 2812 includes an integrated processor (not shown) configured to determine relative height data and transfer these data to an external controller.

Figure 29:
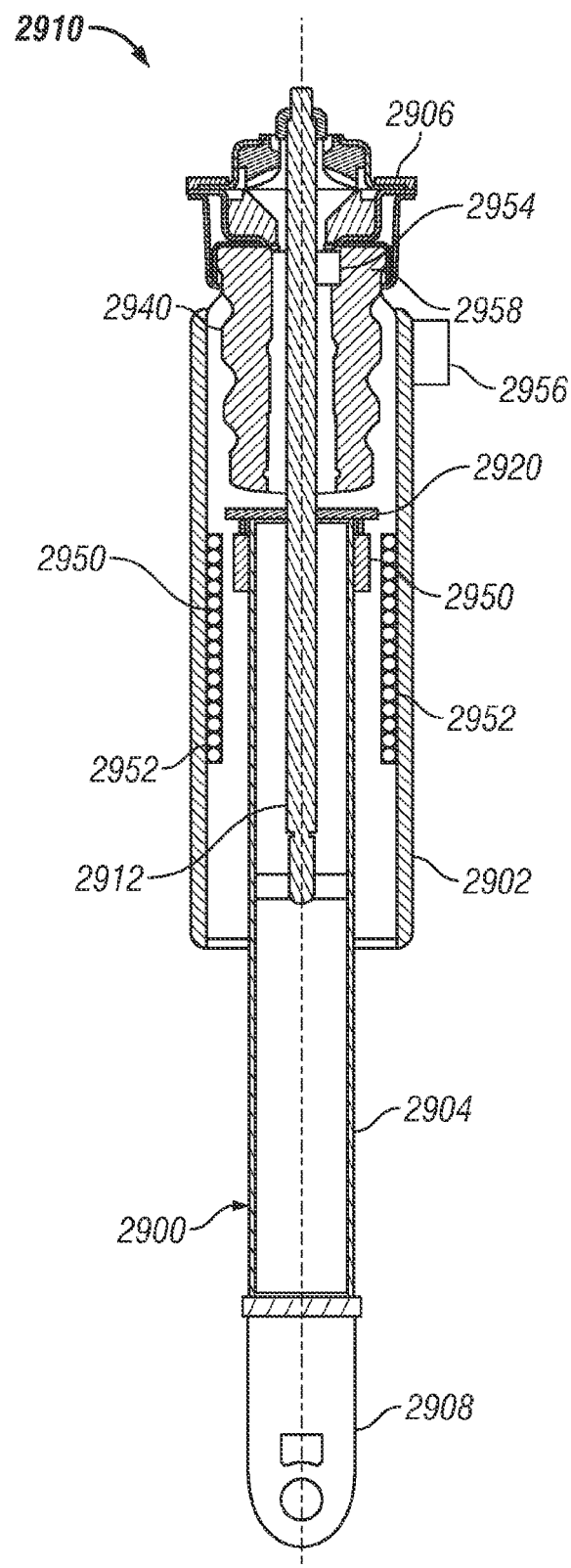
FIG. 29 is cross-sectional view of a sensor system in accordance with a further exemplary embodiment.

FIG. 29 is a cross sectional view of another embodiment of a sensor system 2910 incorporated into a suspension damper assembly 2900, which may form part of suspension system 120 (FIG. 1), that incorporates a system for measuring distance between two components of the damper assembly. Although the specific configuration of damper assembly 2900 may vary from one implementation to another, this exemplary embodiment generally includes an outer cover 2902, a damper tube 2904, an upper mounting element 2906, a lower mounting element 2908, an optional jounce bumper 2940, and a rod 2912. These features of damper assembly 2900 cooperate as described above.

As noted above, damper assembly 2900 incorporates certain features, elements, and components of a system that measures the relative distance between sprung and unsprung components. In this regard, the exemplary embodiment depicted in FIG. 29 includes a magnet 2950, a coil 2952, a wireless ultra-wideband (UWB) transceiver 2954, and an interface module 2956. Coil 2952 is electrically coupled to interface module 956 using, for example, one or more wires. Interface module 2956 is electrically coupled to UWB transceiver 2954 using, for example, one or more wires.

Magnet 2950 may be realized as a ring-shaped permanent magnet that is attached to damper tube 2904. In this embodiment, magnet 2950 wraps around the outside of damper tube 2904 at a location that resides within outer cover 2902. Notably, magnet 2950 is fixed to damper tube 2904 such that it moves in concert with damper tube 2904. In other words, any translation of damper tube 2904 relative to outer cover 2902 will result in the same translation of magnet 2950. The specific size, shape, electromagnetic characteristics, and longitudinal mounting position of magnet 2950 on damper tube 2904 may vary.

Coil 2952 may be realized using one or more electrical conductors (e.g., copper wire) that are wound in an appropriate manner. Coil 2952 may be packaged as a ring or annular sleeve that is attached to outer cover 2902 at a location that accommodates electromagnetic coupling with magnet 2950. In this embodiment, coil 2952 is positioned around the inner wall of outer cover 2902 at location adjacent to magnet 2950 and in a manner that provides physical clearance between magnet 2950 and coil 2952. Generally, the longitudinal dimension of coil 2952 accommodates the travel range of magnet 2950. In other words, the magnetic field generated by magnet 2950 should have an influencing effect on coil 2952 regardless of the position of damper tube 2904 relative to outer cover 2902. Notably, coil 2952 is fixed to outer cover 2902 such that it moves in concert with outer cover 2902. In other words, any translation of outer cover 2902 relative to damper tube 2904 will result in the same translation of coil 2952. The specific size, shape, electromagnetic characteristics, and longitudinal mounting position of coil 2952 on outer cover 2902 may vary.

Movement of magnet 2950 relative to coil 2952 induces electrical current in coil 2952. Thus, motion of damper tube 2904 relative to outer cover 2902 will establish current in coil 2952. In a vehicle deployment as described here, the current induced in coil 2952 may vary in magnitude and frequency, depending upon the operating conditions. For example, if the vehicle is stationary and the suspension is completely passive, then little or no electrical current will be established in coil 2952. Conversely, if the vehicle is driving at a high velocity and over a very rough or bumpy road, then electrical current with relatively high magnitude and frequency will be generated.

Coil 2952 is electrically coupled to interface module 2956 such that any induced electrical current can be provided to interface module 2956 for conditioning, processing, handling, etc. Depending upon the embodiment, interface module 2956 may be located outside of outer cover 2902 (as shown) or inside of outer cover 2902. Moreover, preferred embodiments utilize a hermetically sealed package for interface module 2956 that is suitable for typical vehicle operating environments. Interface module 2956 is suitably configured to convert the induced electrical current into one or more useable DC voltages. The one or more DC voltages may then be used to charge at least one energy storage element and/or be used to power interface module 2956 and UWB transceiver 2954.

UWB transceiver 2954 is electrically coupled to interface module 2956 in a manner that accommodates signal and/or data transmission between UWB transceiver 2954 and interface module 2956. Notably, UWB transceiver 2954 is realized as a device or component that is attached, rigidly connected, or fixed to upper mounting element 2906 such that it moves in concert with outer cover 2902 and upper mounting element 2906. In other words, any translation of outer cover 2902 relative to damper tube 2904 will result in the same translation of UWB transceiver 2954. In the illustrated embodiment, the mounting location for UWB transceiver 2954 is a cap 2958.

UWB transceiver 2954, which preferably operates under the control of interface module 2956, is suitably configured to transmit and receive UWB signals as needed to support the distance measuring system. UWB transceivers and technologies are known to those familiar with radio frequency (RF) communication techniques, and UWB technology will not be described in detail here. UWB transceiver 2954 may include at least one antenna, a receiver element, a transmitter element, and other RF front end elements that are typically found in RF transceiver devices.

UWB transmissions are characterized by very low power levels that utilize a very large portion of the RF spectrum. The UWB signals generated by UWB transceiver 2954 may be considered to be very low power pulses that are very narrow in the time domain, but are very wide in the frequency domain. Typical UWB signals may contain frequency content that is spread within the frequency band of 3.1 GHz to 10.6 GHz. The characteristics of UWB signals make them particularly suitable for onboard vehicle applications that might otherwise introduce high amounts of signal interference, signal reflections, etc. UWB technology can deliver high quality of service in relatively harsh electromagnetic interference environments, e.g., an automobile deployment. The wide bandwidth of the UWB signal enables robust signal detection and message recovery.

UWB transceiver 2954 is suitably configured to transmit UWB measurement pulses toward damper tube 2904, and to receive corresponding UWB pulses that have been reflected from a reflective surface associated with damper tube 2904. In other words, each UWB measurement pulse propagates from UWB transceiver 2954, to the reflective surface, and back to UWB transceiver 2954. In this description, a reflected UWB pulse represents a reflected version of a corresponding UWB measurement pulse. Thus, a reflected UWB pulse is actually a UWB measurement pulse that has propagated along a certain path, and a reflected UWB pulse received at UWB transceiver 2954 is actually a UWB measurement pulse that has returned to UWB transceiver 2954.

Notably, the reflective surface of damper is realized on a feature or component that is attached, rigidly connected, or fixed to damper tube 2904 such that it moves in concert with damper tube 2904. In other words, any translation of damper tube 2904 relative to outer cover 2902 will result in the same translation of the reflective surface. In the illustrated embodiment, the reflective surface is realized on stopper plate 2920 (accordingly, stopper plate 2920 may be considered to be a reflector for UWB transceiver 2954). Alternatively, the reflective surface could be realized on the top end (rod guide) 2922 of damper tube 2904. Alternatively, the reflective surface could be realized elsewhere on damper tube 2904 or on another component that is rigidly attached to damper tube 2904.

The reflective surface has certain characteristics that make it a good reflector of UWB signals and UWB energy. This allows the reflector to efficiently reflect UWB measurement pulses generated by UWB transceiver 2954. For example, the reflective surface can be a smooth surface of an electrically conductive material such as metal. Ideally, the reflective surface can effectively and efficiently reflect UWB signals with little loss in energy, thus improving the detection capability of UWB transceiver 2954. In this regard, UWB transceiver 2954 and the reflective surface are configured, arranged, and located so as to maximize the energy of the reflected signal. In certain embodiments, the reflective surface can be constructed so as to focus the reflected energy toward the UWB transceiver 2954.

As described in more detail below, UWB transceiver 2954 may be designed for operation in a plurality of different modes, including a measurement mode and a reporting mode. As described in more detail below, while operating in the measurement mode, interface module 2956 derives or calculates the distance between the two monitored components (e.g., the damper and outer cover of a damper assembly), where the distance is based upon certain characteristics of the UWB measurement pulse and the corresponding UWB reflected pulse.

The reporting mode of system can be utilized to send measurement data to control module, which in turn can receive, interpret, analyze, and initiate an appropriate response. The measurement data is preferably sent with an appropriate identifier or data that uniquely identifies the measured location or component (unique at least within the monitored vehicle environment). For example, if the vehicle has four dampers, then the measurement data transmitted by each of the four UWB transceivers will include a respective identifier, e.g., a Damper_ID. In practical embodiments, may be associated with an air suspension, an active stability control subsystem, a traction control subsystem, an anti-roll subsystem, a dynamic active suspension subsystem, or other subsystem of the vehicle, where such a subsystem can process and react to the dynamically changing distance/height between the sprung and unsprung mass components of the vehicle.

In some embodiments that utilize a single UWB transceiver, the measurement mode and the reporting mode are sequential in time. In practice, a distance measurement could be taken once every 1.0 to 10.0 ms, depending on the application. Such a high sample rate is desirable to ensure that the distance is monitored and measured in virtually real-time.

While operating in the measurement mode, a UWB measurement pulse or signal is transmitted from the UWB transceiver 2954. The UWB measurement pulse is directed toward the reflective element (e.g., plate 2920), which then reflects the UWB measurement pulse back to the UWB transceiver 2954. The UWB transceiver receives the reflected UWB pulse from the reflective element. Thereafter, the pulse propagation time associated with the UWB measurement pulse and the reflected UWB pulse are calculated. The pulse propagation time is derived from the transmit time of the UWB measurement pulse and the receipt time of the reflected UWB pulse. In some embodiments, the pulse propagation time is simply calculated as the difference between the receipt time and the transmit time. The pulse propagation time will be dependent upon the current distance between the UWB transceiver and the reflective surface. Consequently, the pulse propagation time will be indicative of the distance between the two monitored components of interest (e.g., the damper and the outer cover). Accordingly, calculating, deriving, or otherwise determining a distance measurement may continue.

It should be appreciated that the distance measurement may be expressed in any convenient scale, and that the distance measurement may indicate the distance between any two reference points associated with the monitored system. In other words, the distance measurement may represent a translated, offset, transformed, or scaled distance that is merely based upon the pulse propagation time. The distance measurement need not be strictly linked to the two features or surfaces used to obtain the pulse propagation time. In general, an algorithm may be used that converts time of flight of the UWB signal into a number or expression that represents the derived separation distance (d) as a function of the time difference: $d=f(\Delta t)$.

While operating in the reporting mode, the distance measurement can be formatted, configured, packaged, modulated, or otherwise prepared for UWB transmission. An example could involve a packet data based transmission scheme where the header associated with the packet data indicates the vehicle damper location and/or a unique node identification, along with derived measured data. When the distance measurement information is ready for transmission, the UWB transceiver can transmit one or more distance measurement signals or pulses that convey information or data that is associated with the distance measurement. When received, the distance measurement signals or pulses can be processed with the onboard control module in an appropriate manner and as needed.

When a vehicle is equipment with multiple transceivers, for example, if the vehicle has four dampers, then the measurement data will be transmitted by each of the four UWB transceivers. To avoid interference, the transceivers can be either synchronized or unsynchronized. If operated in a synchronized fashion the transceivers will have a prescribed time slot in which to transmit their measurement data. If operated in an unsynchronized fashion the transceivers will use either direct sequence spread spectrum (DSSS) or frequency hopping spread spectrum (FHSS) to enable all the transceivers to operate without interference to the other transceivers. The technique of operating multiple devices with PN or hopping sequences as used in a DSSS or FHSS will be familiar to those practiced in this art.

Figure 30:
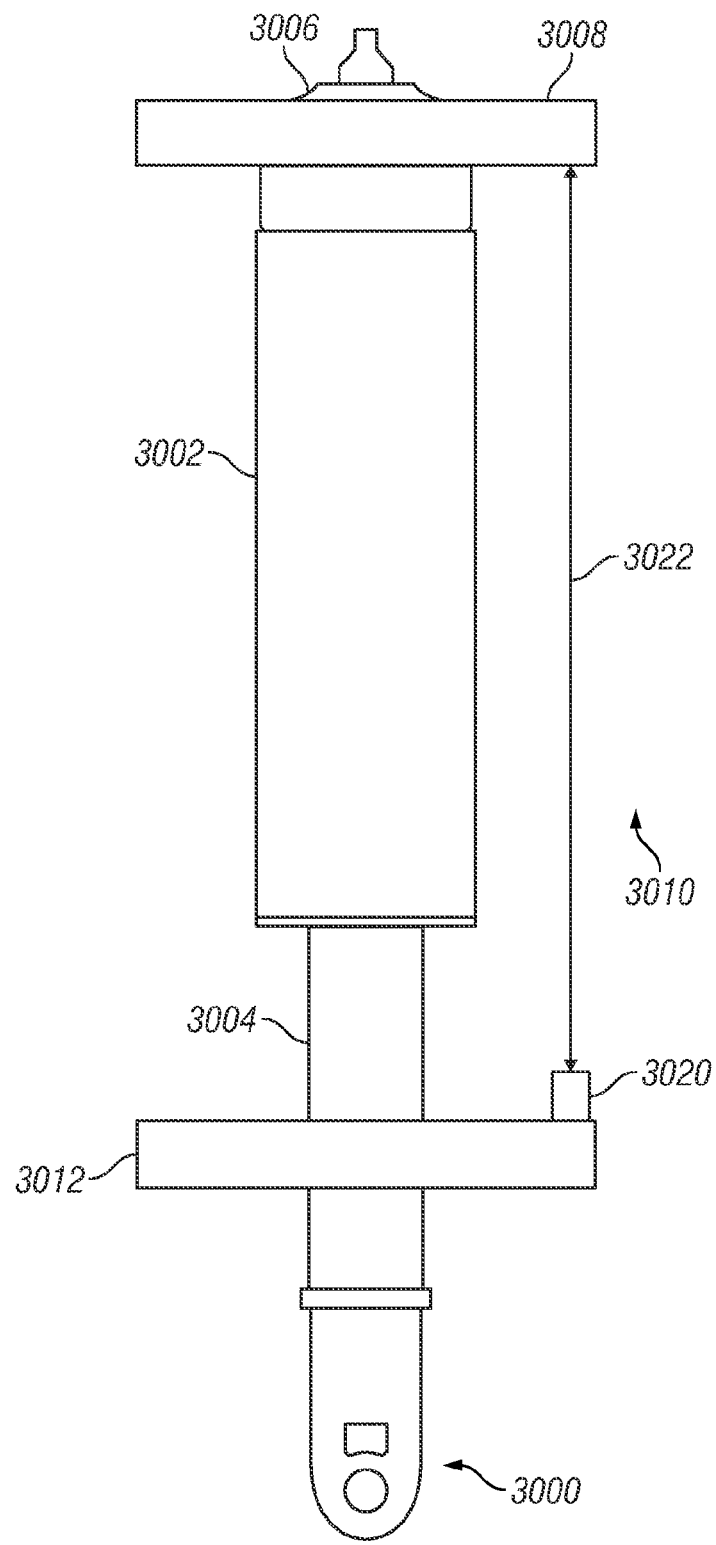
FIG. 30 is cross-sectional view of a sensor system in accordance with a further exemplary embodiment.

FIG. 30 is a cross sectional view of another embodiment of a sensor system 3010 incorporated into a suspension damper assembly 3000 for measuring distance between two of its components. Damper assembly 3000 is similar to damper assembly 2900 of FIG. 29 in many respects, and common features and characteristics will not be redundantly described here.

Damper assembly 3000 includes an outer cover 3002, a damper tube 3004, an upper mounting element 3006, an upper structural element 3008 coupled to upper mounting element 3006 and/or to outer cover 3002, and a lower structural element 3010 coupled to damper tube 3004. In some embodiments, upper structural element 3008 is configured to function as an upper spring seat for damper assembly 3000, and lower structural element 3012 is configured to function as a lower spring seat for damper assembly 3000. The spring seats cooperate with a coil spring or air spring (not shown) that surrounds damper 3004 and outer cover 3002. The spring seats maintain the coil spring in place and the lower spring seat moves in concert with damper 3004.

Damper assembly 3000 preferably includes a distance measurement module 3020 that is connected to lower structural element 3010. Notably, distance measurement module 3020 is fixed to damper tube 3004 such that it moves in concert with damper tube 3004. In other words, any translation of damper tube 3004 relative to outer cover 3002 will result in the same translation of distance measurement module 3020.

Distance measurement module 3020 may be realized using any number of distinct circuits, devices, processor elements, electrical components, or the like. In practice, distance measurement module 3020 may include or otherwise be associated with an electromagnetic energy harvester, a rectifier/regulator, at least one energy source, a processor, and a UWB transceiver as described above.

Distance measurement module 3020 is positioned such that it can transmit UWB measurement pulses toward upper structural element 3008. Notably, upper structural element 3008 serves as a reflector for the UWB measurement pulses. Distance measurement module 3020 and upper structural element 3008 are arranged and configured such that a path 3022 can be established between distance measurement module 3020 and upper structural element 3008. The operation of damper assembly 3000 and its integrated distance measuring system are similar to that described above.

Figure 31:
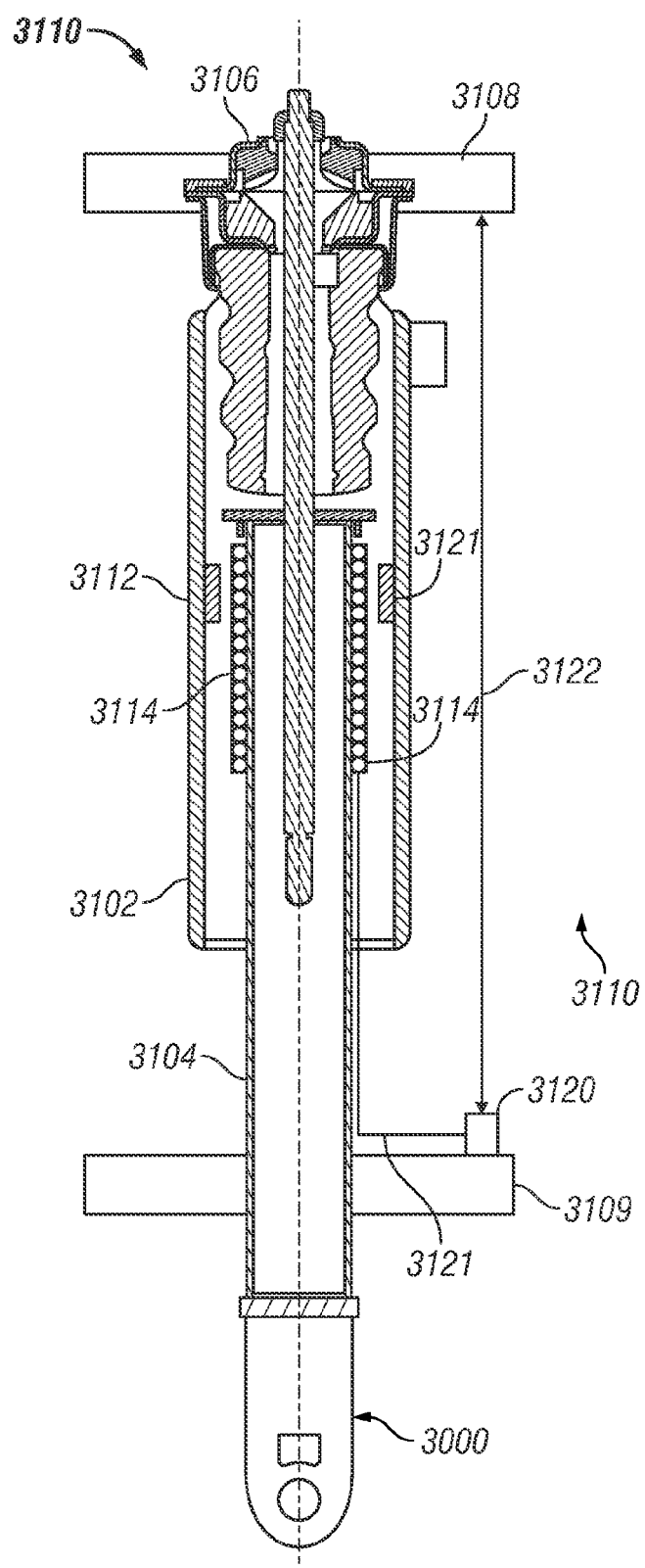
FIG. 31 is cross-sectional view of a sensor system in accordance with a further exemplary embodiment.

FIG. 31 is a cross sectional view of another embodiment of a sensor system 3110 incorporated into a suspension damper assembly 3100 that incorporates a system for measuring distance between two of its components. Damper assembly 3110 is similar to damper assemblies discussed above.

Damper assembly 3110 includes an outer cover 3102, a damper 3104, an upper mounting element 3106, an upper structural element 3108 coupled to upper mounting element 3106 and/or to outer cover 3102, and a lower structural element 3109 coupled to damper tube 3104. Damper assembly 3110 also includes a magnet 3121 attached to outer cover 3102, and a coil 3114 attached to damper 3104.

Damper assembly 3110 includes a distance measurement module 3120 that is connected to lower structural element 3109 and moves in concert with damper tube 3104. Distance measurement module 3120 can be electrically coupled to coil 3114 using one or more wires 3121 or conduits. Distance measurement module 3120 may be realized using any number of distinct circuits, devices, processor elements, electrical components, or the like. In practice, distance measurement module 3120 may include or otherwise be associated with a rectifier/regulator, at least one energy source, a processor, and a UWB transceiver as described above. In certain embodiments, distance measurement module 3120 represents a self-contained package that incorporates these elements.

Distance measurement module 3120 is positioned such that it can transmit UWB measurement pulses toward upper structural element 3108. Notably, upper structural element 3108 serves as a reflector for the UWB measurement pulses. Distance measurement module 3120 and upper structural element 3108 are preferably arranged and configured such that a propagation path 3122 can be established between distance measurement module 3120 and upper structural element 3108. The operation of damper assembly 3110 and its integrated distance measuring system are similar to that described above.

Figure 32:
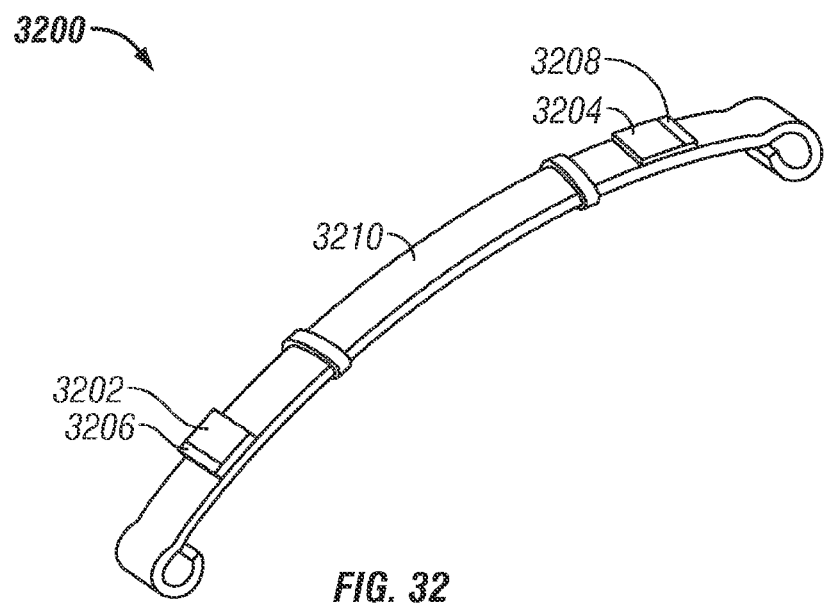
FIG. 32 is an isometric view of an exemplary self-powered sensor assembly in accordance with a further exemplary embodiment.

FIG. 32 is an isometric view of a self-powered sensor assembly 3200 incorporated onto a transverse composite leaf spring assembly 3210 of a type previously described, the transverse composite leaf spring is mounted laterally in the vehicle, i.e., one end is mounted to left side of vehicle, and another end is mounted to right side of vehicle. As can be seen, piezoelectric films or patches 3202 and 3204 have been attached at both ends of leaf spring 3210. Wireless transmitters 3206 and 3208, respectively, have also been mounted on leaf spring 3210 as shown and are in electrical communication with piezoelectric films 3202 and 3204, respectively. In this embodiment, the piezoelectric films 3202 and 3204 may function as a sensor. For example, the change in strain on the piezoelectric films 3202 and 3204 would indicate the relative positions/acceleration between the left side and right side suspension, the relative displacement/acceleration between the sprung and unsprung masses, and the force/strain/stress on leaf spring 3200. As such, the piezoelectric films or patches 3202 and 3204 may be used as energy harvester to charge a rechargeable battery, as well as supporting wireless transmission of transmitting the signal, and as a portion of the sensor itself.

Figure 33:
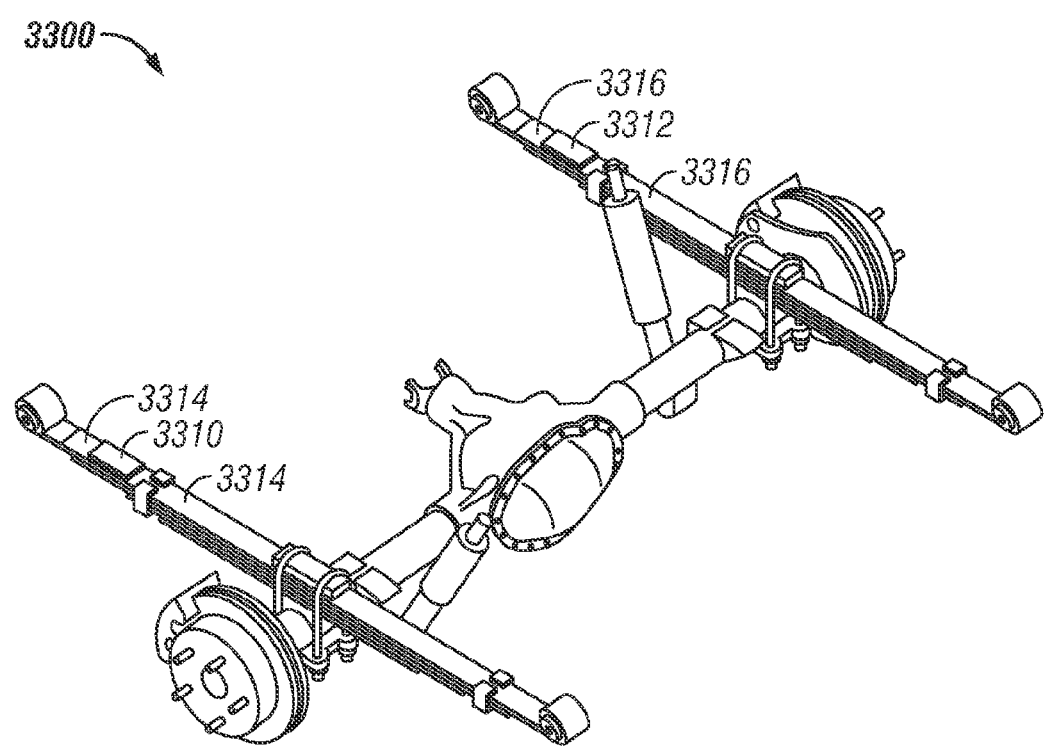
FIG. 33 is an isometric view of an exemplary self-powered sensor assembly in accordance with a further exemplary embodiment.

FIG. 33 is an isometric view of a self-powered sensor assembly 3300 incorporated onto composite leaf spring assemblies 3314 and 3316, similar to the embodiment of FIG. 32, although the leaf spring assemblies 3314 and 3316 may be a light duty rear suspension. Piezoelectric films 3310 and 3312 and transmitters 3314 and 3316 may be mounted on the leaf springs assemblies 3314 and 3316, respectively. As above, the self-powered wireless multifunctional suspension sensor assembly 3300 will sense vehicle dynamic parameters such as force, displacement, velocity, acceleration, stress, and strain. Energy is recovered from the vibrations of the leaf springs to power the multifunctional sensors and wireless transmitters. The piezoelectric stress and strain could also be used to monitor leaf spring damage during vehicle life due to fatigue. If necessary, one or more energy converters 220 (FIG. 2) may be mounted on the leaf spring assemblies 3314, 3316 and adjacent to piezoelectric films 3310 and 3312, respectively.

Figure 34:
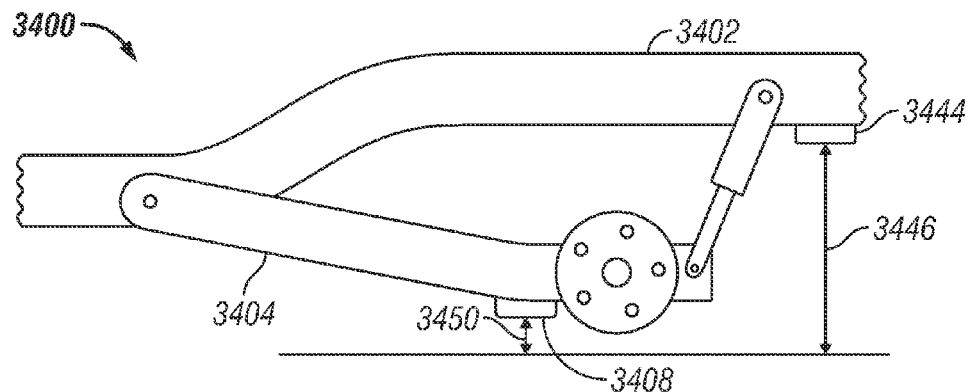
FIG. 34 is a side view of a self-powered height sensor system in accordance with a further exemplary embodiment.

FIG. 34 is an isometric view of exemplary deployment of a self-powered sensor system 3400, which in this embodiment is a height sensor assembly that provides absolute height and relative displacement between the sprung and unsprung mass (e.g., between component 3402 and component 3404), and as a result, improved chassis control. Such height measurements can be used in connection with an air suspension, an electronic stability control subsystem, an anti-roll subsystem, a dynamic suspension control subsystem, or the like.

Although not specifically shown in FIG. 34, the self-powered suspension system 3400 may include one or more energy harvesters as described above, including micro-turbines, permanent magnets, piezoelectric jounce bumpers, and the like. The self-powered suspension system 3400 may further include an energy converter such as a rectifier or regulator, a super capacitor, a wireless transmitter, and a housing or bracket.

FIG. 34 illustrates a sprung mass 3402 and an unsprung mass 3404 of a vehicle. The sensor system 3400 includes a first sensor 3444 that includes a transceiver that sends a signal pulse toward the surface upon which the vehicle is supported; e.g. the roadway. A reflected signal is received back as indicated by arrow 3446. A second sensor 3448 that includes a transceiver that sends a signal pulse that is reflected from the roadway as indicated by arrow 3450. The height of each sensor 3444 and 3448 is then calculated as described above to determine the respective positions above the roadway. Thereafter, the relative position between the sprung mass 3440 and the unsprung mass 3442 may be determined.

Figure 35:
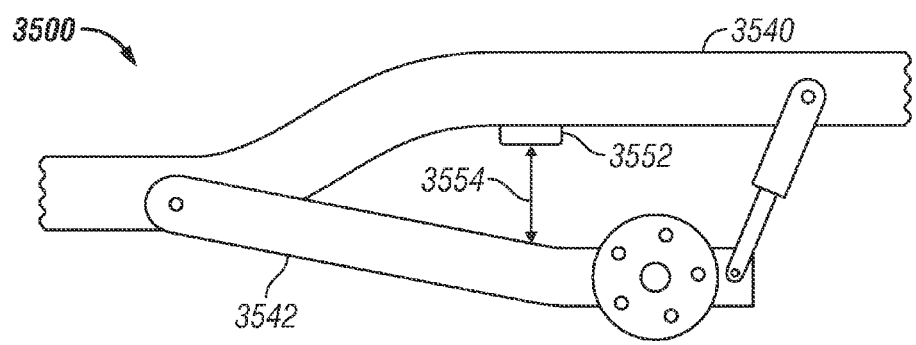
FIG. 35 is a side view of a self-powered height sensor system in accordance with a further exemplary embodiment.

FIG. 35 is an isometric view of exemplary deployment of a self-powered sensor system 3500, which in this embodiment is a height sensor assembly that provides absolute height and relative displacement between the sprung and unsprung mass similar to the systems discussed above. Although not specifically shown in FIG. 35, the self-powered suspension system 3500 may include one or more energy harvesters as described above. The self-powered suspension system 3600 may further include an energy converter such as a rectifier or regulator, a super capacitor, a wireless transmitter, and a housing or bracket.

FIG. 35 illustrates a sensor 3552 mounted on the sprung mass 3540 and a reflector 3554 mounted on the unsprung mass 3542 of a vehicle. The single sensor 3552 includes a transceiver that transmits a pulse to the reflector 3554, which is reflected back to the sensor 3552. A processor then determines the relative position between sprung mass 3540 and unsprung mass 3542 based on the length of time it takes the pulse to travel from sensor 3552, engage reflector 3554, and be received back at sensor 3552.

Figure 36:
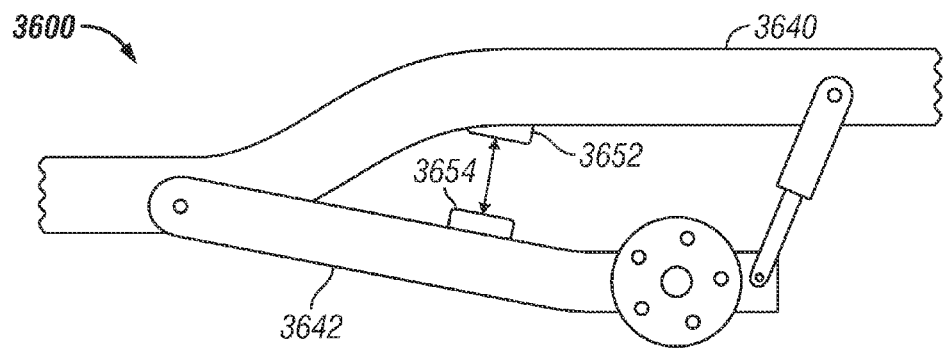
FIG. 36 is a side view of a self-powered height sensor system in accordance with a further exemplary embodiment.

FIG. 36 is an isometric view of exemplary deployment of a self-powered sensor system 3600, which in this embodiment is a height sensor assembly that provides absolute height and relative displacement between the sprung and unsprung mass similar to the systems discussed above. Although not specifically shown in FIG. 36, the self-powered suspension system 3600 may include one or more energy harvesters as described above. The self-powered suspension system 3600 may further include an energy converter such as a rectifier or regulator, a super capacitor, a wireless transmitter, and a housing or bracket.

FIG. 36 particularly illustrates a first sensor 3652 mounted on the sprung mass 3640 (i.e., the first component 102 of FIG. 1) and a second reflector 3654 mounted on the unsprung mass 3642 (i.e., the first component 104 of FIG. 1) of a vehicle. The first sensor 3652 includes a transceiver that transmits a pulse to the reflector 3654. The relative position between sprung mass 3640 and unsprung mass 3642 may be determined based on the time it takes for the pulse to travel from the first sensor 3652 to the second sensor 3654.

Accordingly, self-powered sensor systems have been provided. It should be appreciated that a vast number of variations exist. For example, the self-powered sensor systems may include a battery or capacitor could be packaged with the rectifier or packaged separately. A rectifier assembly could be mounted with the energy harvesting device or on a separate structure. In addition to the embodiments discussed above, the self-powered sensor systems may be employed with a linear actuator used in active or semi-active control systems, lifting gate strut assemblies, and the like.

Energy from vehicle vibrations is converted to a form suitable for storage and/or use by a sensor that measures a vehicle parameter. The resulting measurements may be transmitted to a vehicle controller for enhanced vehicle control or health management. The measurement system described herein is advantageous because it leverages non-contact position sensing with reduced cost, and increased reliability and accuracy. Moreover, the measurement system is self-powered, transmits the measurement data wirelessly, and eliminates the need for data and power transmission wires to and from the vehicle controller.

It should be appreciated that the exemplary embodiments are only examples, and are not intended to limit the scope, applicability, or configuration in any way. Rather, the foregoing summary and detailed description will provide those skilled in the art with a convenient road map for implementing an exemplary embodiment or embodiments of the invention, it being understood that various changes may be made in the function and arrangement of described elements without departing from the scope as set forth in the appended claims and their legal equivalents.

The invention claimed is:

1. A vehicle system, comprising:
a damper assembly comprising:
    a dust tube assembly; and
    a damper tube assembly mounted for telescopic movement within the dust tube during vehicle travel;
a sensor mounted within the dust tube and configured to detect a position of the dust tube; and
an energy harvesting device mounted on the damper assembly and configured to provide electrical energy to the sensor.

2. A vehicle system, comprising:
a vehicle suspension apparatus configured for movement during vehicle travel;
a sensor comprising a piezoelectric device mounted on the vehicle suspension apparatus and configured to generate electrical energy indicative of the movement of the vehicle travel,
wherein the vehicle suspension apparatus includes a first leaf spring assembly and a second leaf spring assembly, and
wherein the piezoelectric device indicates a relative displacement of the first and second leaf spring assemblies;
an energy converter coupled to the piezoelectric device and mounted on the first leaf spring assembly, the energy converter configured to convert the electrical energy of the sensor into a signal indicating the relative displacement; and
a transmitter coupled to the energy converter and mounted on the first leaf spring assembly, the transmitter configured to transmit the signal to a vehicle controller.

3. A vehicle system, comprising:
a vehicle suspension apparatus configured for movement during vehicle travel;
an energy harvesting device mounted on the vehicle suspension apparatus and configured to generate electrical energy in response to the movement of the vehicle suspension apparatus; and
a sensor mounted on the vehicle suspension apparatus and coupled to the energy harvesting device for receiving the electrical energy,
wherein the vehicle suspension apparatus is a damper assembly comprising:
a dust tube assembly;
a jounce bumper assembly mounted within the dust tube assembly at a first end thereof; and
a damper tube assembly mounted for telescopic movement within the dust tube assembly and through a second end thereof, the jounce bumper assembly configured to be impacted by the damper tube assembly; and
wherein the energy harvesting device comprises a piezoelectric device coupled to the jounce bumper assembly.

4. The vehicle system of claim 3, wherein the piezoelectric device is imbedded into the jounce bumper assembly.

5. The vehicle system of claim 3, wherein the piezoelectric device is mounted on a surface of the jounce bumper assembly.

6. The vehicle system of claim 3, further comprising an energy converter coupled to the piezoelectric device.

7. A vehicle system, comprising:
a vehicle suspension apparatus configured for movement during vehicle travel;
an energy harvesting device mounted on the vehicle suspension apparatus and configured to generate electrical energy in response to the movement of the vehicle suspension apparatus; and
a sensor mounted on the vehicle suspension apparatus and coupled to the energy harvesting device for receiving the electrical energy,
wherein the vehicle suspension apparatus is a damper assembly capable of reciprocating translational movement, and
wherein the energy harvesting device comprises:
a coil mounted within the damper assembly;
an engine mounted within the damper assembly for converting the translational movement into rotational movement; and a magnet coupled to the engine and configured to be rotated in the vicinity of the coil to produce electrical energy in the coil.

8. The vehicle system of claim 7, wherein the engine comprises a micro-turbine.

9. The vehicle system of claim 7, wherein the damper assembly includes a fluid chamber divided into first and second parts by a piston, and wherein fluid flows between the first and second parts in response to the reciprocating translational movement, and wherein the micro-turbine is mounted proximate the piston.

10. The vehicle system of claim 7, wherein the micro-turbine comprises:
- a housing coupled to the piston;
- a spindle rotatably coupled to the housing;
- at least one turbine-blade coupled proximate a first end of the spindle and exposed to the fluid for rotating the spindle in response to fluid flow; and
- a base coupled proximate a second end of the spindle and rotatable therewith.

11. A vehicle system, comprising:
- a vehicle suspension apparatus configured for movement during vehicle travel;
- an energy harvesting device mounted on the vehicle suspension apparatus and configured to generate electrical energy in response to the movement of the vehicle suspension apparatus; and
- a sensor mounted on the vehicle suspension apparatus and coupled to the energy harvesting device for receiving the electrical energy,
- wherein the sensor includes a wireless ultra-wideband (UWB) transceiver, and
- wherein the vehicle suspension apparatus includes a first component and a second component, and wherein the wireless UWB transceiver is coupled to the first component, the wireless UWB transceiver being configured to transmit a UWB measurement pulse toward the second component, and to receive a reflected UWB pulse from a reflective surface of the second component, wherein the reflected UWB pulse represents a reflected version of the UWB measurement pulse, the sensor being configured to derive a relative distance between the first component and the second component based upon characteristics of the UWB measurement pulse and the reflected UWB pulse.

12. The vehicle system of claim 11, wherein:
the first component is an unsprung component of the vehicle; and
the second component is a sprung component of the vehicle.

13. The vehicle system of claim 11, wherein the vehicle suspension apparatus is a damper assembly comprising:
- a dust tube; and
- a damper tube telescopically mounted within the dust tube and configured for oscillating translational movement with respect thereto;
- wherein the energy harvesting device comprises:
  - a magnet fixedly coupled to one of the dust tube or the damper tube; and
  - a coil fixedly coupled to the other of the dust tube or the damper tube to achieve relative translational movement between the magnet and the coil inducing a current in the coil.

14. The vehicle system of claim 13, further comprising an energy converter coupled to the coil and an energy storage device coupled to the energy converter.

15. The vehicle system of claim 11, wherein the vehicle suspension apparatus includes a vehicular spring assembly configured for compressions and extensions during vehicle travel; and
wherein the energy harvesting device includes a piezoelectric device coupled to the vehicular spring assembly for generating electrical energy in response to strain imposed thereon in response to the compressions and extensions.

16. The vehicle system of claim 15, wherein the spring assembly comprises a leaf spring.

17. The vehicle system of claim 15, wherein the spring assembly comprises a coil spring.

\* \* \* \* \*